US008913546B2

(12) United States Patent
Brisebois et al.

(10) Patent No.: US 8,913,546 B2
(45) Date of Patent: *Dec. 16, 2014

(54) USING MOBILE COMMUNICATION DEVICES TO FACILITATE COORDINATING USE OF RESOURCES

(71) Applicant: AT&T Mobility II LLC, Atlanta, GA (US)

(72) Inventors: Arthur Brisebois, Cumming, GA (US); Sharat S. Chander, Woodridge, IL (US)

(73) Assignee: AT&T Mobility II LC, Atlanta, GA (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/863,541

(22) Filed: Apr. 16, 2013

(65) Prior Publication Data

US 2013/0229934 A1     Sep. 5, 2013

Related U.S. Application Data

(63) Continuation of application No. 13/489,228, filed on Jun. 5, 2012, now Pat. No. 8,442,542, which is a continuation of application No. 12/343,168, filed on Dec. 23, 2008, now Pat. No. 8,213,951.

(51) Int. Cl.
*H04B 7/14* (2006.01)
*H04W 72/04* (2009.01)
*H04W 72/08* (2009.01)
*H04W 88/04* (2009.01)

(52) U.S. Cl.
CPC ........ *H04W 72/085* (2013.01); *H04W 72/0413* (2013.01); *H04W 72/082* (2013.01); *H04W 88/04* (2013.01)

USPC .......................................... 370/315; 455/450

(58) Field of Classification Search
USPC ................... 455/450; 370/315, 338
See application file for complete search history.

(56) References Cited

U.S. PATENT DOCUMENTS

2007/0280172 A1* 12/2007 Tan et al. ...................... 370/335
2008/0167043 A1*  7/2008 Sipila ............................ 455/436
2009/0041246 A1   2/2009 Kitazoe
2009/0227261 A1   9/2009 Tiirola et al.

OTHER PUBLICATIONS

OA dated Sep. 22, 2011 for U.S. Appl. No. 12/343,168, 26 pages.
OA dated Aug. 6, 2012 for U.S. Appl. No. 13/489,228, 29 pages.

* cited by examiner

*Primary Examiner* — Marcos Batista
(74) *Attorney, Agent, or Firm* — Amin, Turocy & Watson, LLP

(57) ABSTRACT

Resource blocks associated with communication devices can be managed. A mobile device(s) at cell edge identifies its in-use resource blocks (RBs) to a neighbor base station, or in-use RBs of a neighbor base station to the serving base station. In the former instance, the neighbor base station sorts RBs in ascending order based on signal strengths respectively associated with the RBs and mobile devices; in the latter instance, the serving base station ranks RBs in ascending order based on signal strengths respectively associated with the RBs and neighbor base stations. RBs having weakest signal strength are reused first for mobile devices at cell edge. Base station establishes a direct wireless radio path with another base station facilitated by employing a sequence of subframes where all subframes but a specified subframe are blanked, and data is transmitted between base stations during the specified subframe.

20 Claims, 20 Drawing Sheets

USING MOBILE COMMUNICATION DEVICES TO FACILITATE COORDINATING USE OF RESOURCES

RELATED APPLICATIONS

This patent application is a continuation of U.S. patent application Ser. No. 13/489,228, filed Jun. 5, 2012, and entitled, "USING MOBILE COMMUNICATION DEVICES TO FACILITATE COORDINATING USE OF RESOURCES," which is a continuation of U.S. Pat. No. 8,213,951, issued Jul. 3, 2012, and entitled, "USING MOBILE COMMUNICATION DEVICES TO FACILITATE COORDINATING USE OF RESOURCES." The entireties of each of the above noted applications are incorporated by reference herein.

TECHNICAL FIELD

The subject innovation generally relates to wireless communications, and, more particularly, to utilizing mobile communication devices to facilitate coordinating use of resources.

BACKGROUND

When a mobile device is being served by a base station, the serving base station can utilize specified resource blocks for transmission associated with the mobile device. When a user with a mobile device is traveling, the mobile device may reach a point where the synch channel signal strength between the mobile device and the serving base station can be of a similar magnitude as the synch channel signal strength(s) between the mobile device and one or more neighbor base stations. At this point, the mobile station can be at a cell edge, where the mobile device potentially may receive interference from a neighboring base station serving the mobile device on the same resource blocks or channels as the serving base station.

Conventionally, a base station can communicate with neighbor base stations (e.g., via an X2 interface in LTE) to indicate to the neighbor base stations which resource blocks are being employed by the base station. However, using such resources to signal the resource blocks that are in use can be inefficient as that can leave such resources unavailable for other purposes, such as delivering data from a base station towards the Internet or delivering data to another mobile device. Further, signaling related to in-use resource blocks between base stations can occur very frequently (e.g., approximately every 2 milliseconds in LTE), which can utilize a lot of transport resources. It can be desirable to reduce the amount of direct signaling between the base stations, particularly with regard to indicating in-use resource blocks, so that the transport resources can be available for other uses, such as transmitting data to a mobile device or the Internet.

Also, base stations may have a limited amount of transport resources available, while having radio resources available that are not being used. Mobile devices often can be sitting idle or are not being utilized at maximum capacity. It can be desirable to be able to leverage available resources such as, for example, available radio resources, to enable more efficient communication between mobile devices, between mobile devices and base stations, and/or between base stations, even when transport resources are limited or unavailable.

DETAILED DESCRIPTION

Figure 1:
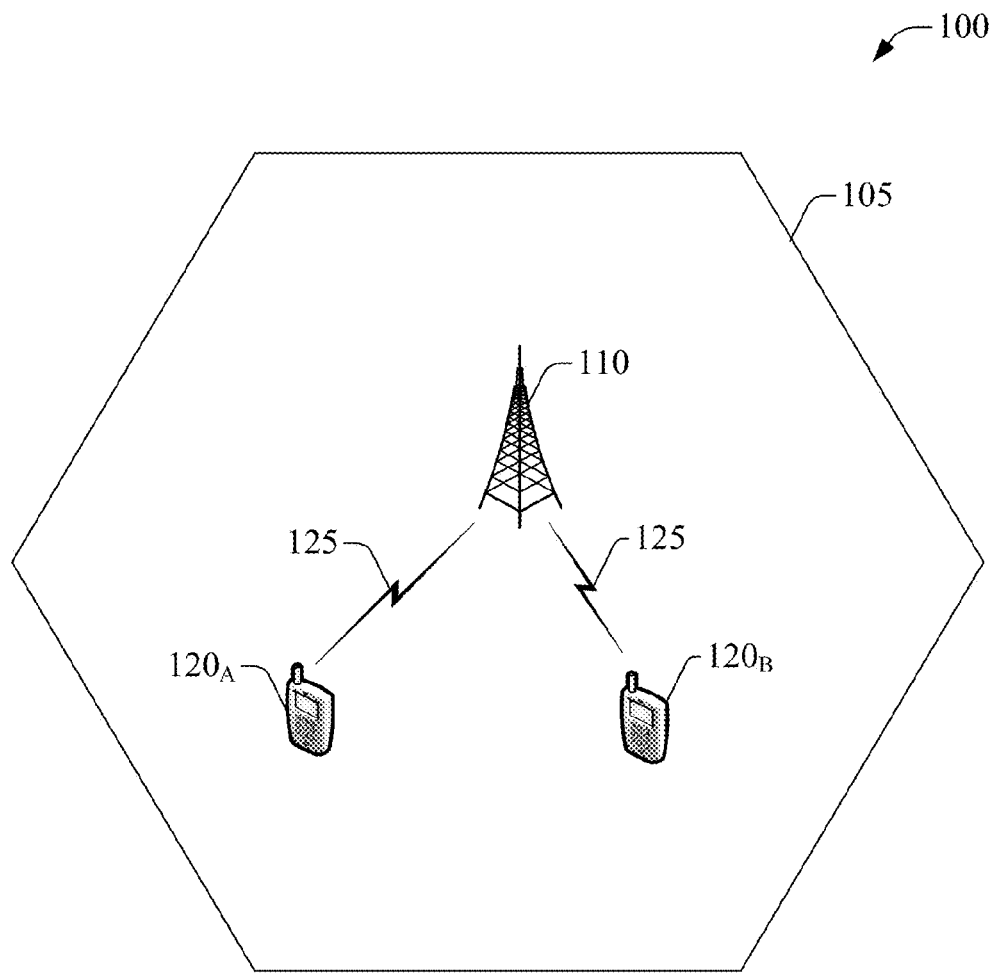
FIG. 1 illustrates a schematic wireless environment in accordance with various aspects and embodiments of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "mobile device," "subscriber station," "communication device," "mobile communication device," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. As utilized herein, the term "prosumer" indicate the following contractions: professional-consumer and producer-consumer.

The following abbreviations are relevant to the subject specification.
  3G Third Generation
  3GPP Third Generation Partnership Project
  AGPS Assisted GPS
  AP Access Point
  ADSL Asymmetric Digital Subscriber Line
  AWS Advanced Wireless Services
  BRAS Broadband Remote Access Server
  BTA Basic Trading Area
  CN Core Network
  CS Circuit-Switched
  CSCF Call Session Control Function
  CPE Customer Premise Equipment
  CPN Customer Premise Network
  DHCP Dynamic Host Configuration Protocol
  DSL Digital Subscriber Line
  DSLAM Digital Subscriber Line Access Multiplexer
  E911 Enhanced 911
  FCC Federal Communications Commission
  FL Forward Link
  GGSN Gateway GPRS Service Node
  GPRS General Packet Radio Service
  GPS Global Positioning System
  GW Gateway
  HAP Home Access Point
  HSS Home Subscriber Server
  ISDN Integrated Services Digital Network
  UE User Equipment
  UTRAN Universal Terrestrial Radio Access Network
  IMS IP Multimedia Subsystem
  IP Internet Protocol
  ISP Internet Service Provider
  MSA Metropolitan Statistical Areas
  MSISDN Mobile Subscriber ISDN Number
  MTA Major Trading Areas
  NAT Network Address Translation
  NTP Network Time Protocol
  O&M Operation and Maintenance
  PC Personal Computer
  PCS Personal Communications Service
  PS Packet-Switched
  PSTN Public Switched Telephone Network
  RAN Radio Access Network
  RBS Radio Base Station
  RL Reverse Link
  RNC Radio Network Controller
  RSA Rural Service Area
  SGSN Serving GPRS Support Node
  SIP Session Initiation Protocol
  USSD Unstructured Supplementary Service Data
  VPN Virtual Private Network
  WAP Wireless Application Protocol
  XDSL Asynchronous-DSL or Synchronous-DSL The subject innovation provides system(s), method(s), and device(s) that can facilitate managing resources associated with communication devices (e.g., mobile devices). In accordance with an embodiment, a mobile device(s) can monitor its synch channel with its serving base station and synch channels between the mobile device and neighbor base stations. When the mobile device determines that the margin between its synch channel with the serving base station and a synch channel between the mobile device and a neighbor base station reaches a predefined threshold level that is deemed to indicate interference, or at least potential for interference, that can be experienced by the mobile device due to the neighbor base station attempting to serve the mobile device using the same resource blocks (RBs) as the serving base station that is serving the mobile device (e.g., mobile device is at cell edge), the mobile device can transmit an unencrypted and heavily encoded "echo" transmission block on an uplink (UL) via a predefined "echo UL channel or another UL channel, as desired. The "echo" transmission block can contain a list of RBs (or subchannels) in use by the mobile device. A neighboring base station(s) can monitor UL channel(s) to detect and receive "echo" transmissions from mobile devices, such as the mobile device. The neighboring base station(s) can determine the respective signal strengths of each "echo" transmission, and can sort RBs in ascending order based at least in part on the respective "echo" signal strengths associated therewith (e.g., signal strength of the "echo" transmission that identified the RBs in use by the mobile device). The neighboring base station can first reuse downlink (DL) RBs associated with the weakest "echo" strength for a mobile device at cell edge in relation to the neighboring base station. Other DL RBs can be used for mobile devices that are not at cell edge.

In accordance with another embodiment, to facilitate managing RB reuse, base stations (e.g., neighboring base stations, serving base station) can broadcast actual RB use on an unencrypted DL bearer, which can be received by mobile devices that detect the broadcast. A mobile device(s) can monitor its synch channel with its serving base station and synch channels between the mobile device and neighbor base stations. When the mobile device determines that the margin between its synch channel with the serving base station and a synch channel between the mobile device and a neighbor base station reaches a predefined threshold level that is deemed to indicate interference or potential for interference that can be received by the mobile device due to the neighbor base station using the same RBs to serve the mobile device as the serving base station is using to serve the mobile device (e.g., mobile device is at cell edge), the mobile device can transmit a message, which reports the signal strength of the neighboring base station and the RBs in use by the neighboring base station, to the serving base station. The serving base station(s) can rank RBs in ascending order based at least in part on the respective signal strengths associated therewith (e.g., RBs in use by the neighboring base station associated with the signal strength of the synch channel between the neighboring base station and the mobile device). The serving base station can first reuse downlink (DL) RBs associated with the weakest signal strength for a mobile device at cell edge in relation to the serving base station. Other DL RBs can be used for mobile devices that are not at cell edge.

In accordance with yet another embodiment, the subject innovation can facilitate establishing an over-the-air (OTA) wireless radio path between two base stations to facilitate communicating data between the base stations using radio resources in place of transport resources. In an aspect, a subframe sequence can be structured such that all subframes in the sequence can be blanked except a specified number (e.g., 1) of subframes. During the time period of the specified subframe(s), a first base station can transmit data via the radio path, and a second base station can monitor the radio path during that time period of the specified subframe(s) and can receive the data. The second base station can serve mobile devices during the time period associated with the blank subframes in the sequence, and can cease transmissions to mobile devices during the time period of the specified subframe(s). As a result, OTA radio resources can be utilized to communicate data between base stations thereby bypassing using transport resources.

In accordance with still another embodiment, a mobile device can be utilized as an intermediary between a mobile device that is further away from a serving base station than the intermediary mobile device or otherwise has a degraded radio path with the serving base station that can be improved by employing the intermediary mobile device to facilitate communicating data between the mobile device and serving base station. In an aspect, when the mobile device determines that its radio path with the serving base station has degraded below a predefined threshold signal level (e.g., mobile device is at cell edge), the mobile device can enter into "echo mode". The mobile device can communicate in-use RBs to the serving base station, and also can transmit a ping request to the serving base station requesting that all or at least a portion of other mobile devices (e.g., active or idle mobile devices), which are served by the serving base station, ping the mobile device. The serving base station can transmit commands to the other mobile devices to ping the mobile device. The mobile device can monitor a channel to detect and receive the pings from the other mobile devices. During this time, the mobile device can enter a desired compressed mode (e.g., TDD mode) to facilitate ceasing its own transmissions while monitoring for pings. The mobile device can transmit a message, which can include information identifying another mobile device (e.g., intermediary mobile device) that can have the nearest acceptable ping, to the serving base station.

In an aspect, the serving base station can facilitate setting up an "echo hop" utilizing the intermediary mobile device when predefined criteria are met. In response to receiving the message identifying the intermediary mobile device having the nearest acceptable ping, the serving base station can transmit a request for a signal quality report to the intermediary mobile device to facilitate determining whether the UL and DL meet the predefined criteria, including, for example, an UL and DL quality that is superior to the UL and DL quality associated with the mobile device. If the serving base station determines that the intermediary mobile device does not meet the predefined criteria, the serving base station can transmit an echo reject message, which indicates that the echo hop will not be established, to the mobile device. If the serving base station determines that the intermediary mobile device meets the predefined criteria, the serving base station can transmit a command to the intermediary mobile device to instruct the intermediary mobile device to enter a desired compressed mode (e.g., TDD mode) and initiate direct mobile device-to-mobile device communications with the mobile device. Once both mobile devices have sent confirmations that the direct communication is established to the serving base station, data (e.g., user data) can be communicated between the mobile device and serving base station via the intermediary mobile device (e.g., the intermediary mobile device can receive data from the mobile device or serving base station and can re-transmit the data to the other of the mobile device or serving base station). If the intermediary mobile device becomes occupied with local user traffic and/or the quality of UL or DL associated with the intermediary mobile device is determined to be of lower quality than the quality of the UL or DL (e.g., direct radio path) for the mobile device, the serving base station can instruct the mobile device and intermediary mobile device to discontinue direct mobile device-to-mobile device communications and further instruct the mobile device to re-establish a direct radio path between the mobile device and the serving base station.

In yet another embodiment, a first mobile device can be employed as an intermediary device that can be utilized to communicate data (e.g., user data, control data) between a second mobile device and a third mobile device when predefined criteria are met. The first mobile device can determine that it is at cell edge in relation to a first base station serving the first mobile device. The second device can be served by the same base station as the first mobile device, and the third mobile device can be served by another base station that neighbors the first base station. If it is determined that the first mobile device has available resources that can be utilized to communicate data between the second mobile device and third device, the first mobile device can be commanded to initiate direct mobile-device communications with the second mobile device and third mobile device. When the three mobile devices have transmitted confirmation messages to their respective base stations confirming that direct mobile-device communications are established, data, or at least a portion thereof, can be communicated between the second mobile device and third mobile device via the first mobile device without using transport resources of the base stations.

In another embodiment, a mobile device can be employed as an intermediary device to facilitate communicating data between a serving base station, which serves the mobile device, and a neighbor base station that neighbors the serving base station, when predefined criteria are met. In an aspect, the mobile device can determine that it is at cell edge in relation to the serving base station. If it is determined that the mobile device has available resources that can be utilized to facilitate communicating data between the serving base station and neighbor base station and other predefined criteria are met, the serving base station can transmit a command to the mobile device instructing the mobile device to establish an "echo" hop so that the mobile device can be utilized to relay data (e.g., user data associated with mobile devices respectively connected to the base stations, control data) from one base station to the other base station. The mobile device can receive the command and set up the "echo" hop. Once the "echo" hop is established, data, or at least a portion of data, can be communicated between the serving base station and neighbor base station via the mobile device without utilizing the transport resources of the base stations.

Referring to the drawings, FIG. 1 illustrates a schematic wireless environment 100 (e.g., a network) in accordance with various aspects and embodiments of the disclosed subject matter. In wireless environment 100, area 105 can represent a coverage macro cell which can be served by base station 110, where the base station 110 can service mobile wireless devices, like UE $120_A$ and UE $120_B$, and such coverage can be achieved via a wireless link 125 (e.g., uplink (UL), downlink (DL)). In an aspect, UE $120_A$ can be a 3GPP Universal Mobile Telecommunication System (UMTS) mobile phone, for example. When an attachment attempt is successful, UE $120_A$ can be served by base station 110 and incoming voice and data traffic can be paged and routed to the UE $120_A$ through the base station 110, and outgoing voice and data traffic from the UE $120_A$ can be paged and routed through the base station 110 to other communication devices (e.g., UE $120_B$).

It is to be appreciated and understood that the various aspects and embodiments disclosed herein can be employed with regard to Long Term Evolution (LTE) technologies, Wi-Max technologies, and/or other communication-related technologies, and the subject innovation is intended to encompass and does encompass all such communication technologies.

Figure 2:
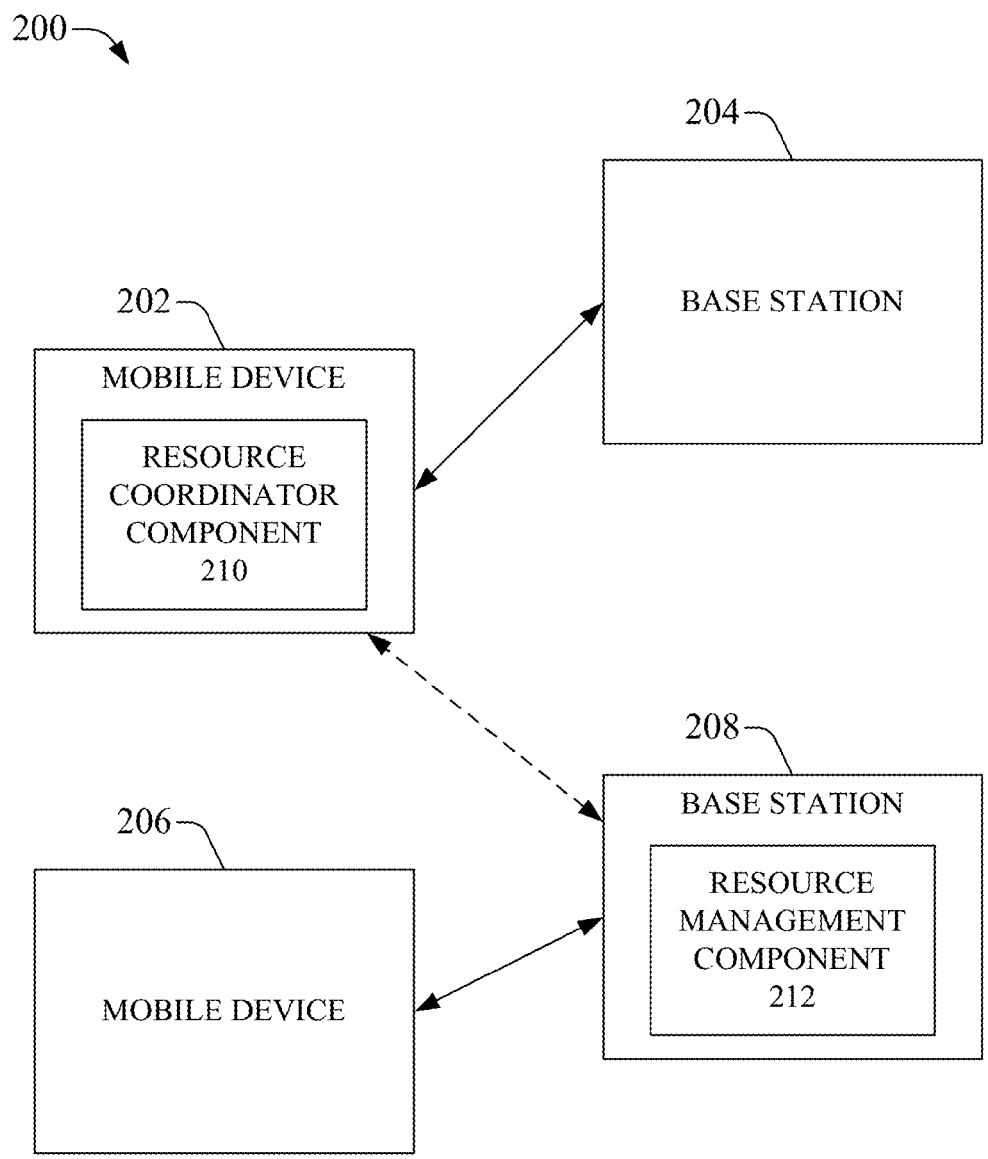
FIG. 2 is a block diagram of an example system that can facilitate coordinating and managing resource blocks associated with mobile devices in accordance with an embodiment of the disclosed subject matter.

FIG. 2 is a block diagram of an example system 200 that can facilitate coordinating and managing resource blocks associated with mobile devices in accordance with an embodiment of the disclosed subject matter. In an aspect, system 200 can comprise a mobile device 202 that can be connected (e.g., wirelessly connected) with a base station 204, which can be serving the mobile device 202, in a wireless communication environment. System 200 also can include another mobile device(s) 206 which can be connected with a base station 208 that can neighbor the base station 204 in the wireless communication environment.

In an aspect, the subject innovation can facilitate efficient management of use and re-use of resource blocks associated with mobile devices, including mobile device 202 and mobile device 206. The base stations, such as base station 204 and base station 208, can employ resource block (RB) (or sub-channel) "hunt groups" that can contain all RBs, which can be arranged in an order of preference. This order of preference can be arranged in a reuse pattern to facilitate avoiding interference all or at least a substantial (e.g., most) portion of the time. For example, for a soft 1/3 reuse, sector 1 (associated with base station 204) can employ pattern: 1,4,7,3,2,6,5,9,8; sector 2 (associated with base station 208) can employ another pattern: 8,5,2,9,7,6,4,3,1; and sector 3 (associated with another base station (not shown)) can employ yet another pattern: 3,6,9,1,2,4,5,7,8. It is to be appreciated and understood that these patterns are for example purposes only and virtually any desired pattern can be employed in accordance with the subject innovation.

In accordance with an embodiment, the mobile device 202 can comprise a resource coordinator component 210 that can provide information regarding its RB use to a neighbor base station(s) (e.g., 208) when the mobile device 202 determines that it is at cell edge (e.g., point where the mobile device 202 potentially may receive interference from a neighbor base station(s) 208 serving the mobile device 202 on the same RBs as the serving base station 204) to facilitate coordinating reuse of RBs associated with mobile devices to facilitate reducing instances of interference experienced by a mobile device due to a neighbor base station serving the mobile device using the same RBs as the serving base station. In one aspect, the resource coordinator component 210 can monitor and measure the synch channel signal strength between the mobile device 202 and the serving base station 204 and respective synch channels signal strengths between the mobile device 202 and neighbor base stations, such as base station 208. The resource coordinator component 210 can compare the respective synch channel signal strengths to facilitate determining whether the margin (e.g., difference) between the signal strength associated with the mobile device 202 and serving base station 204 and the signal strength associated with the mobile device 202 and a neighbor base station 208 is within a predefined threshold level.

In accordance with an aspect, if the resource coordinator component 210 determines that the margin (e.g., difference) between the synch channel signal strength of the mobile device 202 and serving base station 204 and the synch channel signal strength of the mobile device 202 and a neighbor base station (e.g., 208) meets a predefined threshold level that is deemed to indicate that the mobile device 202 is at cell edge, the resource coordinator component 210 can generate a transmission block, which can be an unencrypted and heavily encoded "echo" transmission block that can be added on the UL and transmitted to the neighbor base station 208. In an aspect, the "echo" transmission block can be added on any desired UL channel or a predefined "echo" UL channel. In an aspect, the "echo" transmission block can comprise information that can include a list of RBs or subchannels that are in use by the mobile device 202. Also, the "echo" transmission block can be transmitted at a specified level of power.

In an aspect, the base station 208 (e.g., neighbor base station of mobile device 202) can comprise a resource management component 212 that can be utilized to efficiently manage RB reuse. In accordance with an embodiment, the resource management component 212 can monitor UL channels and can detect and receive the "echo" transmission block from the mobile device 202 (and "echo" transmission blocks from other mobile devices). The base station 208 can utilize the information in the "echo" transmission block to facilitate managing reuse of RBs. In an aspect, the resource management component 212 can decode the "echo" transmission block (and any other "echo" transmission blocks received from other mobile devices). The resource management component 212 can evaluate the information in the received "echo" transmission block(s), and can evaluate respective signal strengths of the "echo" transmissions from the mobile devices, such as mobile device 202, as echo signal strength can be an indication of path loss between potential interfering sectors).

In an aspect, the resource management component 212 can arrange the RBs in an ascending order of pertinent "echo" signal strength associated with the mobile devices to facilitate selecting RBs for reuse. The "echo" signals from mobile devices can be transmitted at a specified power. The further away a mobile device is from a base station, the more path loss there can be, and the lower the "echo" signal can be when received by the base station (e.g., neighbor base station 208). The resource management component 212 can determine the relative "echo" signal strengths of mobile devices (e.g., 202) based at least in part on the respective levels of the "echo" signals from the mobile devices, as the stronger the "echo" signal is, the closer the mobile device can be to the neighbor base station 208. If the "echo" signal of a mobile device (e.g., 202) not served by the neighbor base station 208 is relatively strong, there can be a significant amount of interference received by the mobile device 202, if the neighbor base station 208 is using the same RB(s) to attempt to serve the mobile device 202 as the serving base station 204 is using when serving the mobile device 202.

In another aspect, the resource management component 212 can select and reuse the DL RB(s) associated with the weakest "echo" signal strength first for a mobile device at cell edge (e.g., mobile device 202, when the mobile device determines that it is at cell edge). The resource management component 212 can utilize other DL RBs for mobile devices that are not at cell edge. In still another aspect, the resource management component 212 can select and reuse the UL RB(s) associated with the weakest "echo" signal strength first for a mobile device at cell edge. The resource management component 212 can utilize other UL RBs for mobile devices that are not at cell edge. Reusing RBs associated with mobile devices having the largest path loss (e.g., weakest "echo" signal) can facilitate providing clean channels on the DL for the victim mobile device (e.g., 202) that is reporting the "echo" and clean channels on the UL for a mobile device, which is newly served by a base station (e.g., 208) and is assigned RBs being reused.

In one aspect, if the mobile device 202 is being served by the serving base station 204 using the same RB(s) that the neighbor base station 208 is employing to serve mobile device 206, the resource management component 212 of the neighbor base station 208 can communicate with the base station 204 using transport resources (e.g., via the X2 interface) to facilitate coordinating RB use so that a RB(s) that is/are the same can be changed by one of the base stations based at least in part on predefined resource criteria, such as relative Quality of Service (QoS) Class Identifier (QCI) class of the mobile devices, relative power of the mobile devices, applications being employed, user profiles, etc. For example, it can be determined that a mobile device having a higher QCI class than another mobile device can continue to utilize the current RBs and the RB(s) that is/are the same can be changed for the mobile device with the lower QCI class. As another example, it can be determined that a mobile device utilizing more power than another mobile device can continue to utilize the current RBs and the RB(s) that is/are the same can be changed for the mobile device using a lower amount of power, as the mobile device using more power, when moved to a different RB that can be worse than the current RB, may have to use even more power, which can be undesirable. Managing the use of RBs so that there is no RB conflict between the RBs used by the serving base station (e.g., 204) when serving the mobile device (e.g., 202) and the RBs used by a neighbor base station (e.g., 208) serving the mobile device (e.g., 202) when the mobile device is at cell edge can facilitate reducing interference experienced by a mobile device due to a neighbor base station serving the mobile device using the same RBs as the serving base station. Using the mobile device (e.g., 202) to indicate which RBs it is using to the neighbor base station(s) (e.g., 208) when the mobile device is at cell edge can facilitate reducing signaling between base stations using the transport resources (e.g., via X2 interface) as compared to conventional communication systems.

Figure 3:
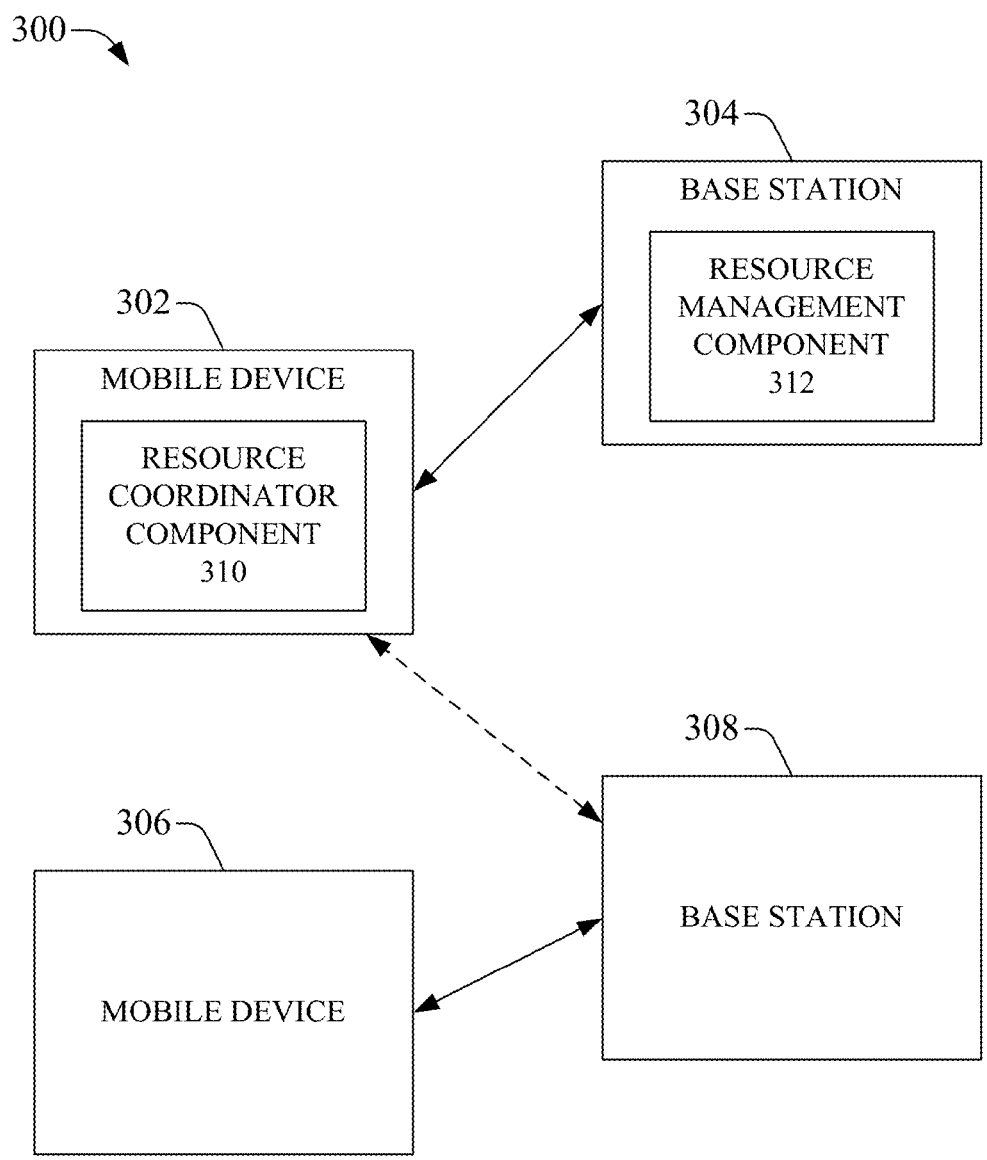
FIG. 3 is a block diagram of another example system that can facilitate coordinating and managing resource blocks associated with mobile devices in accordance with an embodiment of the disclosed subject matter.

FIG. 3 is a block diagram of an example system 300 that can facilitate coordinating and managing resource blocks associated with mobile devices in accordance with an embodiment of the disclosed subject matter. In an aspect, system 300 can comprise a mobile device 302 that can be connected (e.g., wirelessly connected) with a base station 304, which can be serving the mobile device 302, in a wireless communication environment. System 300 also can include another mobile device(s) 306 which can be connected with a base station 308 that can neighbor the base station 304 in the wireless communication environment.

In an aspect, the subject innovation can facilitate efficient management of use and re-use of RBs associated with mobile devices, including mobile device 302 and mobile device 306. The base stations, such as base station 304 and base station 308, can employ RB (or subchannel) "hunt groups" that can contain all RBs, which can be arranged in an order of preference. This order of preference can be arranged in a reuse pattern to facilitate avoiding interference all or at least a substantial (e.g., most) portion of the time. For example, for a soft 1/3 reuse, sector 1 (associated with base station 304) can employ pattern: 1,4,7,3,2,6,5,9,8; sector 2 (associated with base station 308) can employ another pattern: 8,5,2,9,7,6,4,3,1; and sector 3 (associated with another base station (not shown)) can employ yet another pattern: 3,6,9,1,2,4,5,7,8. It is to be appreciated and understood that these patterns are for example purposes only and virtually any desired pattern can be employed in accordance with the subject innovation. In an aspect, base stations, such as base station 304 and base station 308, can broadcast actual RB use on an unencrypted DL bearer (e.g., full power), which can be received by any mobile device (e.g., 302, 306) that can hear or detect the broadcast.

In accordance with an aspect, the mobile device 302 can comprise a RB coordinator component 310 that can provide information regarding the synch channel signal strength between the mobile device 302 and a neighbor base station 308, and RB use associated with the neighbor base station 308, to the serving base station 304 when the mobile device 302 determines that it is at cell edge (e.g., point where the mobile device 302 potentially may receive interference from a neighbor base station(s) 308 serving the mobile device 302 on the same RBs as the serving base station 304) to facilitate coordinating reuse of RBs associated with mobile devices to facilitate reducing instances of interference experienced by a mobile device due to a neighbor base station serving the mobile device using the same RBs as the serving base station. In one aspect, the resource coordinator component 310 can monitor and measure the synch channel signal strength between the mobile device 302 and the serving base station 304 and respective synch channels signal strengths between the mobile device 302 and neighbor base stations, such as base station 308. The resource coordinator component 310 can compare the respective synch channel signal strengths to facilitate determining whether the margin between the signal strength associated with the mobile device 302 and serving base station 304 and the signal strength associated with the mobile device 302 and a neighbor base station 308 is within a predefined threshold level.

In another aspect, if the resource coordinator component 310 determines that the margin (e.g., difference) between the synch channel signal strength of the mobile device 302 and serving base station 304 and the synch channel signal strength of the mobile device 302 and a neighbor base station (e.g., 308) meets a predefined threshold level that is deemed to indicate that the mobile device 302 is at cell edge, the resource coordinator component 310 can transmit or broadcast a message (e.g., "echo" transmission) to the serving base station 304, where the message can comprise information, such as synch channel signal strength between the mobile device 302 and a neighbor base station 308, and RBs in use by the neighbor base station 308, to facilitate efficient RB re-use. If the neighbor base station 308 is using the same RB(s) as the serving base station 304, the serving base station 304 can communicate with the neighbor base station 308 to arbitrate any conflicts in RB use between the RBs used by the mobile device 302 and the RBs used by the neighbor base station 308.

In accordance with an embodiment, the serving base station 304 can comprise a resource management component 312 that can be utilized to efficiently manage RB reuse. The resource management component 312 can receive the message from the mobile device 302 and can evaluate the information received in the message. Based at least in part on the evaluation of the received information, the resource management component 312 can rank DL RBs in ascending order of the respective pertinent "echo" signal strength associated with mobile devices (e.g., 302) to facilitate reusing RBs associated with the mobile device having the weakest signal strength first with regard to a cell edge mobile device(s). In an aspect, when determining respective signal strengths of RBs, virtually any desired calculation, determination, and/or filtering of measurements can be employed. For example, multiple measurements of signal strength can be taken, as desired, and the multiple measurements of signal strength associated with a mobile device can be averaged, the measurements can be filtered to identify a maximum signal strength, the measurements can be filtered to identify desired measurements of signal strength (e.g., measurements deemed more important based in part on specified criteria), etc., as desired, to facilitate ranking the RBs in ascending order of the pertinent "echo" signal strength associated with the RBs.

In another aspect, the resource management component 312 can select and reuse the DL RB(s) associated with the weakest "echo" signal strength first for a mobile device at cell edge (e.g., mobile device 302, when the mobile device determines that it is at cell edge). The resource management component 312 can utilize other DL RBs for mobile devices that are not at cell edge.

In an aspect, if the mobile device 302 is being served by the serving base station 304 using the same RB(s) that the neighbor base station 308 is employing to serve mobile device 306, the resource management component 312 of the base station 304 can communicate with the neighbor base station 308 using transport resources (e.g., via the X2 interface) to facilitate coordinating RB use so that a RB(s) that is/are the same can be changed by one of the base stations based at least in part on predefined resource criteria, so that the mobile device 302 at the cell edge is not using the same RBs as the mobile device 306 being served by the neighbor base station 308. Managing the use of RBs so that there is no RB conflict between the RBs used by the serving base station 304 when serving the mobile device 302 and the RBs used by a neighbor base station 308 serving the mobile device 302 when the mobile device 302 is at cell edge can facilitate reducing interference experienced by a mobile device 302 due to a neighbor base station 308 serving the mobile device 302 using the same RBs as the serving base station 304. Using the mobile device (e.g., 302) to indicate which RBs it is using and the signal strength of the neighbor base station(s) (e.g., 308) when the mobile device is at cell edge to facilitate reducing RB conflicts can facilitate reducing signaling between base stations using the transport resources as compared to conventional communication systems. The subject innovation can facilitate using a mobile device to report in-use RBs and signal strength associated with neighbor base stations when the mobile device is at cell edge without neighbor base stations having to monitor mobile devices served by other base stations. The subject innovation also can obtain more information from more mobile devices due in part to the mobile device using the UL path to communicate the report to the serving base station.

Figure 4:
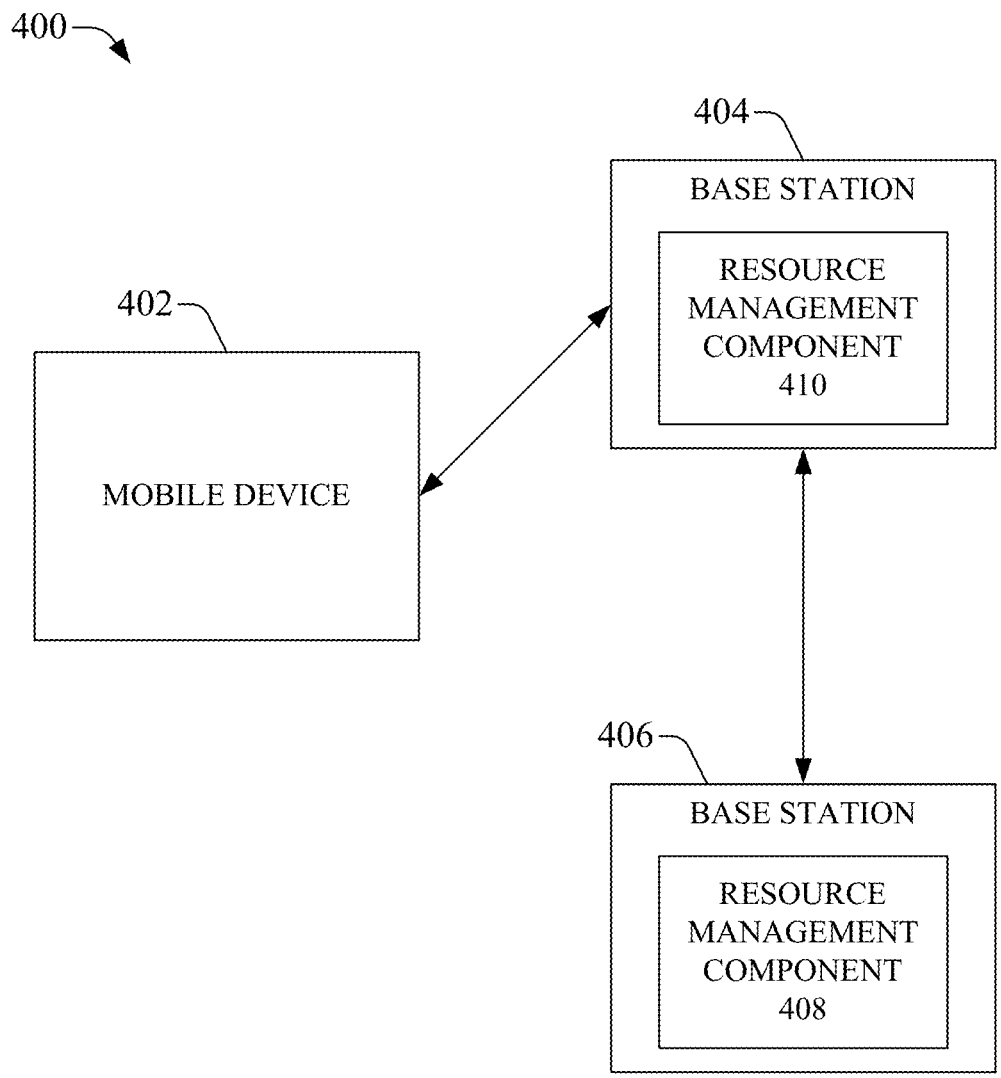
FIG. 4 illustrates a block diagram of an example system that can facilitate managing resources associated with mobile devices and base stations in accordance with another embodiment of the disclosed subject matter.

Turning to FIG. 4, illustrated is a block diagram of an example system 400 that can facilitate managing resources associated with mobile devices and base stations in accordance with another embodiment of the disclosed subject matter. In an aspect, system 400 can comprise a mobile device 402 that can be connected (e.g., wirelessly connected) with a base station 404, which can be serving the mobile device 402, in a wireless communication environment. System 400 also can include a neighbor base station 406 in the wireless communication environment.

In accordance with an embodiment, blank subframes can be employed to facilitate tower to tower coordination (e.g., tower to tower resource coordination) between the serving base station 404 and neighbor base station 406. In an aspect, the neighbor base station can comprise a resource management component 408 that can facilitate managing resources associated with the base station 406. In another aspect, all but a specified subframe (or specified number of subframes) of a sequence of subframes can be blanked, where the resource management component 408 can provide signaling information via the specified subframe at the specified time the specified subframe appears in the sequence to the base station 404 via an interface (e.g., X2 interface), where the signaling information can indicate RBs being used by the base station 406 and/or other data (e.g., voice traffic, data traffic), for example. The serving base station 404 can comprise a resource management component 410 that can monitor the interface (e.g., X2 interface) between the base station 404 and base station 406 to detect the specified subframe at the specified time that the specified subframe appears in the sequence. The serving base station 404 can serve the mobile device 402 during the subframes other than the specified subframe, and the resource management component 410 can monitor the specified subframe at the specified time to receive the signaling information in the specified subframe. The serving base station 404 can synchronize its transmissions so that the base station 404 is not transmitting information to the mobile device 402 while receiving the signaling information via the specified subframe. The resource management component 410 can utilize the received signaling information to facilitate managing resources, including reuse of RBs, for mobile devices (e.g., mobile device 402) being served by the base station 404 and/or communicating data between mobile devices or between the base stations 404 and 406. In accordance with an embodiment, the mobile device 402 can be configured as an interface modem (e.g., X2 modem) that can have direct interconnection to the BBU scheduler.

The subject innovation, by utilizing a specified subframe to communicate signaling information directly between base stations can facilitate reducing latency, as compared to instances where a mobile device is employed to communicate signaling information, as the amount of time for the hop using the mobile device to re-transmit the signaling information can be eliminated. Further, the communication path between the base stations can be more superior than between a mobile device and base station. The subject innovation also enables radio resources to be employed to communicate signaling information as opposed to transport resources, which can be desirable, particularly when radio resources are available and transport resources are utilized to near capacity. The above efficiencies can be more desirable than any potential reduction in radio capacity in the DL due to the serving base station blanking its transmission for the specified subframe in order to receive the signaling information.

For example, there can be a situation, such as an emergency situation, where a number of cells (e.g., base station cells) are deployed to a confined area, and there is only one satellite UL available for transport resources, but emergency personnel are using many mobile devices to communicate with each other in that confined area. In an aspect, instead of transmitting all the voice traffic of mobile devices from one cell to the satellite link and back to another cell in the confined area, the cells can transport the voice traffic directly between each other (e.g., using radio resources) and can use the satellite for signaling and call coordination.

Figure 5A:
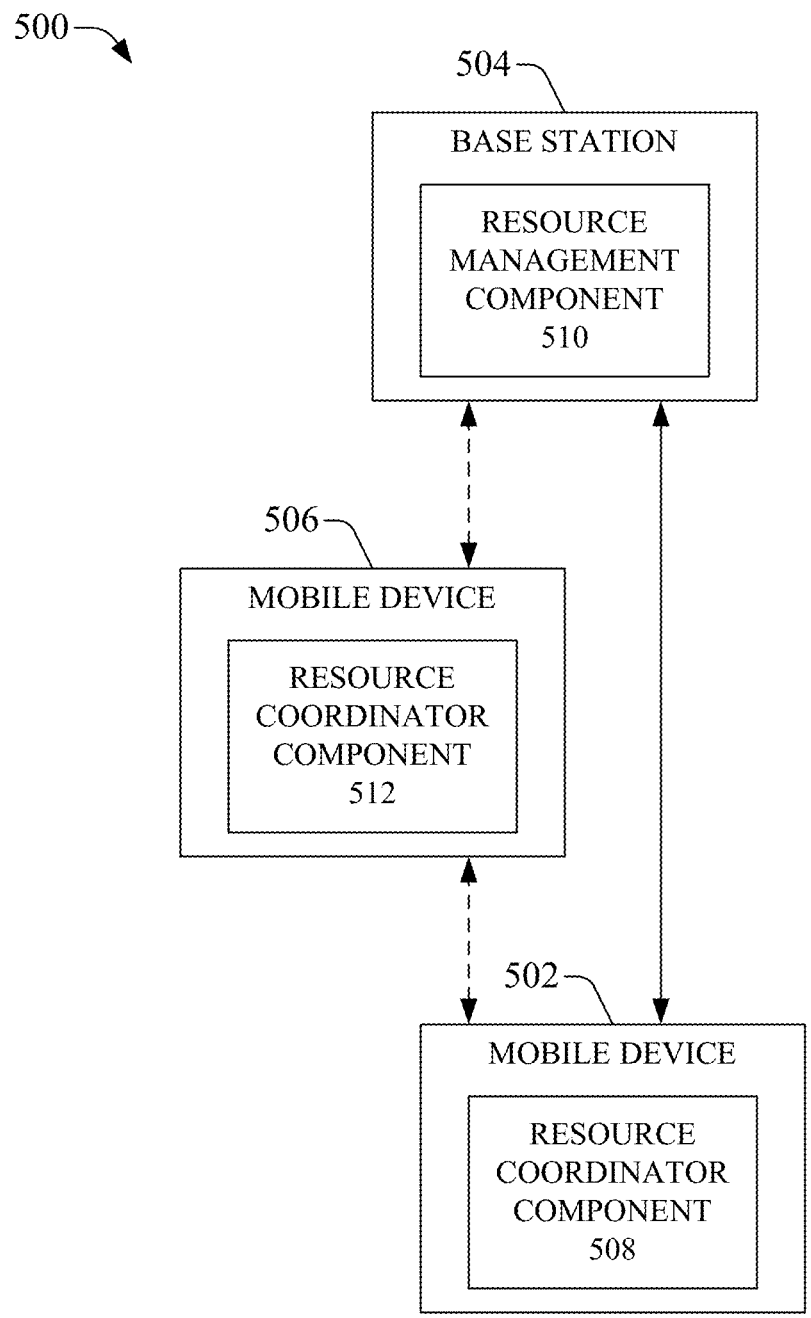
FIG. 5A illustrated is a block diagram of an example system 500 that can facilitate communication of information between a base station and a mobile device utilizing another mobile device in accordance with an embodiment of the disclosed subject matter.

Referring to FIG. 5A, illustrated is a block diagram of an example system 500 that can facilitate communication of information between a base station and a mobile device utilizing another mobile device in accordance with an embodiment of the disclosed subject matter. Often, mobile devices, such as mobile phones or computers that have wireless communication functionality, can be idle or available resources are not being fully engaged, such that the mobile devices can have resources available to facilitate communication of data. For example, a laptop computer can contain a PC card for wireless communication, and the laptop can be sitting unattended, where the laptop is only communicating minimal messages to maintain a wireless connection (e.g., wireless Internet connection, virtual private network (VPN) connection, . . . ). The subject innovation can employ a mobile device having available resources to facilitate communicating data between other devices (e.g., between a base station and another mobile device; between two other mobile devices) via direct mobile-device communication, instead of utilizing transport resources of the base station.

In an aspect, system 500 can comprise a mobile device 502 that can be connected (e.g., wirelessly connected) with a base station 504, which can be serving the mobile device 502 in a wireless communication environment. The base station 504 also can be connected with another mobile device 506 that can be closer to the base station 504 than the mobile device 502. The subject innovation can establish an "echo" hop utilizing an intermediate mobile device 506 to facilitate efficient communication between a distant mobile device 502 and the base station 504, for example, when the intermediate mobile device 506 is not being utilized or otherwise has resources available to be used to facilitate transmission of data between the distant mobile device 502 and base station 506.

In an aspect, system 500 can use an intermediate mobile device, such as mobile device 506 to facilitate augmenting a radio path between a distant mobile device 502 and a serving base station 504 that is serving the intermediate mobile device 506 and distant mobile device 502. In an aspect, the mobile device 502 can comprise a resource coordinator component 508 that can be employed to facilitate coordinating resources associated with the mobile device 502. The resource coordinator component 508 can place (e.g., switch) the mobile device 502 into "echo mode" when the resource coordinator component 508 determines that the radio path between the mobile device 502 and the serving base station 504 has degraded below a predefined radio path limit. In an aspect, the resource coordinator component 508 can employ an echo RB or other RB to transmit a message to the serving base station 504 to request a "ping" from all or least a portion of mobile devices served by the base station 504. The resource coordinator component 508 also can transmit an echo transmission that can indicate the RBs currently in use by the mobile device 502.

In another aspect, the base station 504 can comprise a resource management component 510 that can be utilized to facilitate managing resources associated with the base station and mobile devices (e.g., 502, 506) it serves. Upon receiving the "ping" request from the mobile device 502, the resource management component 510 can transmit or broadcast a command to the other active or idle mobile devices, including mobile device 506, being served by the base station 504 to have those mobile devices "ping" the mobile device 502. The mobile device 506 can comprise a resource coordinator component 512 that can facilitate transmitting a "ping" to the mobile device 502 in response to the command from the base station 504. The other mobile devices served by base station 504 can transmit "pings" to the mobile device 502 as well.

In an aspect, the resource coordinator component 508 of the mobile device 502 can monitor the "pings" from the other mobile devices to facilitate identifying a mobile device that has the nearest acceptable "ping", such as a mobile device that is the nearest mobile device to the base station 504, as desired by the mobile device 502 in accordance with predefined criteria. For example, the resource coordinator component 508 can determine that mobile device 506 has the nearest acceptable "ping" as compared to the "ping" of other mobile devices (not shown). In an aspect, to facilitate monitoring and detecting "pings" from the other mobile devices, as desired, the resource coordinator component 508 can enter the mobile device 502 into a "compressed" or TDD mode to halt the transmissions of the mobile device 502 while monitoring for the "ping" transmissions from the other mobile devices.

When the resource coordinator component 508 detects a nearest acceptable "ping", the resource coordinator component 508 can transmit or broadcast a message to the base station 504 that can identify the mobile device (e.g., 506) having the nearest acceptable "ping".

In another aspect, the base station 504 can receive the message from the mobile device 502, and the resource management component 510 of the base station 504 can facilitate setting up an "echo hop" for the mobile device 502 (e.g., distant mobile device) using the intermediate mobile device (e.g., 506). The resource management component 510 can transmit a request for a signal quality report to the intermediate mobile device 506 to request a signal quality report from the intermediate mobile device 506 to facilitate ascertaining if the UL and DL are acceptable and more desirable than the UL and DL of the mobile device 502 based at least in part on predefined criteria. The resource coordinator component 512 of the mobile device 506 can provide a signal quality report to the base station 504 in response to the request.

If the resource management component 510 determines that the UL and DL of the intermediate mobile device 506 is not acceptable and/or is not more desirable than the distant mobile device 502, the resource management component 510 can transmit an echo reject to the distant mobile device 502. If the resource management component 510 determines that the UL and DL of the intermediate mobile device 506 is acceptable and more desirable than the distant mobile device 502, the resource management component 510 can transmit a command to the intermediate mobile device 506 to command the intermediate mobile device 506 to enter a compressed mode (e.g., TDD mode) and initiate direct mobile device-to-mobile device communications with the distant mobile device 502. A compressed mode, such as TDD mode, can be desirable in order to facilitate preventing de-sense of the mobile device by its own transmitter. The resource coordinator component 512 of the mobile device 506 can facilitate entering the mobile device 506 into a desired compressed mode in response to the command from the base station 504.

The respective resource coordinator components 508 and 512 of the respective mobile devices 502 and 506 can facilitate establishing direct mobile device-to-mobile device communication between them. When both mobile devices 502 and 506 confirm to the base station 504, via messages to the base station 504, that direct mobile device-to-mobile device communications are established between them, the intermediate mobile device 506 can be employed as an "echo" hop and can be utilized to transmit information (e.g., user data) between the distant mobile device 502 and base station 504, as the mobile device 506 can receive information from the mobile device 502 and can communicate that information to the base station 504 and/or can receive information from the base station 504 and can communicate that information to the mobile device 502.

In another aspect, if the intermediate mobile device 506 becomes occupied with local user traffic and/or the quality of the radio path associated with the intermediate mobile device 506 becomes less desirable than the direct radio path between the mobile device 502 and base station 504, the resource management component 510 of the base station 504 can facilitate removing the "echo" hop and re-establishing a direct radio path between the mobile device 502 and base station 504. System 500, by employing an "echo" hop using an intermediate mobile device can facilitate improving communication between a distant mobile device and a base station, as compared to conventional systems.

Figure 5B:
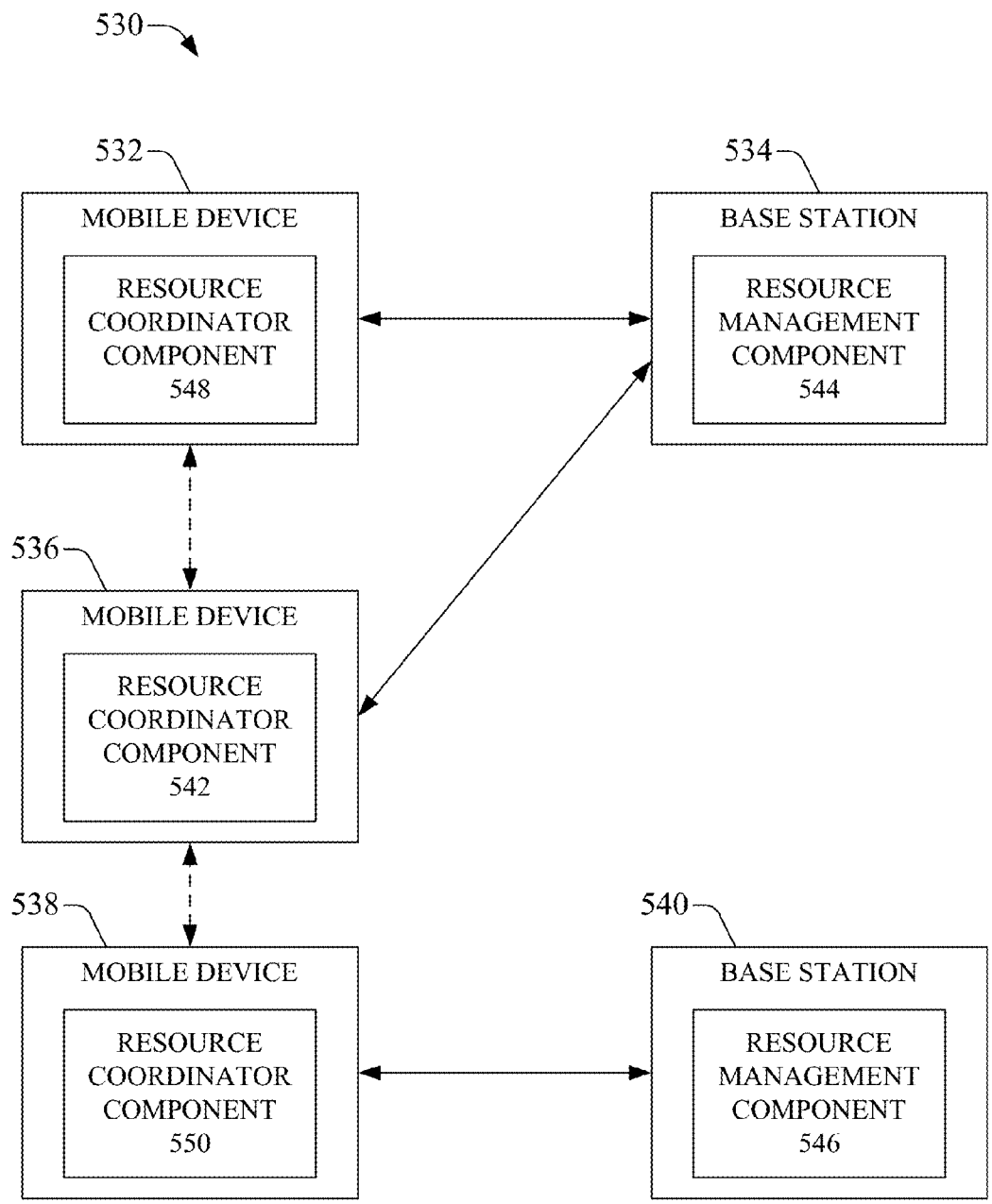
FIG. 5B illustrates a block diagram of an example system that can facilitate communication of information between a mobile device and another mobile device utilizing an intermediary mobile device in accordance with an embodiment of the disclosed subject matter.

Referring to FIG. 5B, illustrated is a block diagram of an example system 530 that can facilitate communication of information between a mobile device and another mobile device utilizing an intermediary mobile device in accordance with an embodiment of the disclosed subject matter. In an aspect, system 530 can comprise a mobile device 532 that can be connected (e.g., wirelessly connected) with a base station 534, which can be serving the mobile device 532 in a wireless communication environment. The base station 534 also can be connected with another mobile device 536 (e.g., mobile phone, computer with wireless communication functionality, . . . ) that can be at cell edge, or at least can be further away in distance than mobile device 532, in relation to the base station 534. In another aspect, system 530 can comprise another mobile device 538 that can be connected (e.g., wirelessly connected) with a base station 540, which can be serving mobile device 538 in a wireless communication environment. Base station 540 can neighbor base station 534. Mobile device 536 can be closer in distance to mobile device 538 than mobile device 532. The subject innovation can establish an "echo" hop utilizing an intermediary mobile device 536 to facilitate efficient communication of data (e.g., user data, such as voice data, message data (e.g., short message service (SMS), enhanced messaging service (EMS), multimedia messaging service (MMS)), Internet-related data, video-related data, audio-related data, electronic gaming data, etc.; and/or control data) between the mobile device 532 associated with the base station 534 and the mobile device 538 associated with the base station 540, for example, when the intermediary mobile device 536 is not being utilized or otherwise has resources available to be used to facilitate transmission of data between the mobile device 532 and mobile device 538.

In an aspect, the intermediary mobile device 536 can comprise a resource coordinator component 542 that can determine when the mobile device 536 is at cell edge in relation to the base station 534 (e.g., can determine that the radio path of mobile device 536 has degraded below a predefined signal threshold level that indicates the mobile device 536 is at cell edge in relation to the base station 534; can determine that margin between the synch channel signal strength of the mobile device 536 and base station 534 and the synch channel signal strength of the mobile device 536 and a neighbor base station (e.g., 540) falls within a predefined threshold level that indicates that the mobile device 536 is at cell edge in relation to base station 534). In another aspect, the base station 534 can comprise a resource management component 544 that can facilitate managing resources associated with the base station 534. The resource coordinator component 542 can transmit information, which can indicate that the mobile device 536 is at cell edge and/or signal strength of the mobile device 536, to the resource management component 544.

The mobile device 532 can be communicating data (e.g., voice data or other user data) with mobile device 538. Based at least in part on predefined resource criteria, the resource management component 544 can determine that it is desirable to utilize mobile device 536 as an intermediary device to communicate (e.g., wirelessly communicate) data between mobile device 532 and mobile device 538, as opposed to routing the data from a mobile device to its serving base station and that base station employing transport resources to communicate the data to the neighbor base station, which forwards the data to the destination mobile device.

For example, the resource management component 544 can analyze the available transport resources of the base station 534 and/or can receive information regarding available transport resources of the base station 538, which can comprise a resource management component 546 that can facilitate providing such information, and can determine that the available transport resources are below a predefined threshold level. The resource management component 544 also can evaluate the resource utilization level of the mobile device 536 to facilitate determining whether the mobile device has available resources that can be utilized to communicate data packets between the mobile device 532 and mobile device 538. If, for instance, the mobile device 536 is in a data session and is determined to have sufficient resources available based at least part on the predefined resource criteria, and the available transport resources are below the predefined threshold level, the resource management component 544 can determine that it is desirable to employ the mobile device 536 as an intermediary device to communicate data (e.g., user data, control data) between mobile device 532 and mobile device 538.

In another aspect, the mobile device 532 can comprise a resource coordinator component 548 and mobile device 538 can comprise a resource coordinator component 550 that each can facilitate coordinating utilization of resources associated with the respective mobile devices. The resource management component 544 can transmit a request to the resource management component 546 to request that the base station 540 command the mobile device 538 to facilitate establishing direct communications with the mobile device 536. The resource management component 546 can transmit the command to the resource coordinator component 550 of mobile device 538 to facilitate establishing direct communications between the mobile device 538 and mobile device 536. The resource management component 544 can transmit a command to the resource coordinator component 542 to instruct the mobile device 536 to initiate direct communications with mobile device 532 and mobile device 538. The resource coordinator component 542 can initiate direct communications with the mobile device 532 and mobile device 538. Mobile device 532 and mobile device 536 can transmit messages to the base station 534 confirming that direct mobile-device communications are established between mobile device 532, mobile device 536, and mobile device 538. Mobile device 538 can transmit a message to base station 538 confirming that the direct mobile-device communications are established, and the resource management component 546 can transmit a message to the resource management component 544 confirming that the direct mobile-device communications are established.

In an aspect, the mobile device 532 and mobile device 538 can communicate data, or at least a portion of communicated data, between each other via intermediary mobile device 536. The resource management component 542 can receive information from the resource coordinator component 542, where the information can comprise identifiers that can indicate which data is pass through data between the mobile device 532 and mobile device 538 (e.g., system-relayed traffic) and which data is part of the data session of the mobile device 536 (e.g., destination traffic or subscriber requested traffic of mobile device 536), and the resource management component 544 can track which data is pass through data between the mobile device 532 and mobile device 538 and which data is part of the data session of the mobile device 536, for instance, to facilitate accurate billing. For instance, the pass through data can be zero-billed traffic so that the account associated with the mobile device 536 is not charged for communicating the pass through data associated with the direct mobile-device communications, but the account can be billed for data communications associated with the data session of the mobile device 536. The resource management component 544 and resource management component 546 also can track what portion of data is transmitted via the direct mobile-device communications and what portion of data is transmitted via the transport resources of the base stations to facilitate ensuring that communicated data reaches its destination.

As an example of direct mobile-device communications, mobile device 532, which is served by base station 534, can desire to transmit data, such as global positioning system (GPS) data to mobile device 538 served by a disparate base station 540. Instead of using transport resources associated with the base station 534 and base station 540, the GPS data can be transmitted from mobile device 532 to mobile device 538 via mobile device 536. The subject innovation can facilitate efficiently managing resources, such as radio resources and transport resources, to facilitate efficient communication of data between mobile devices.

Figure 5C:
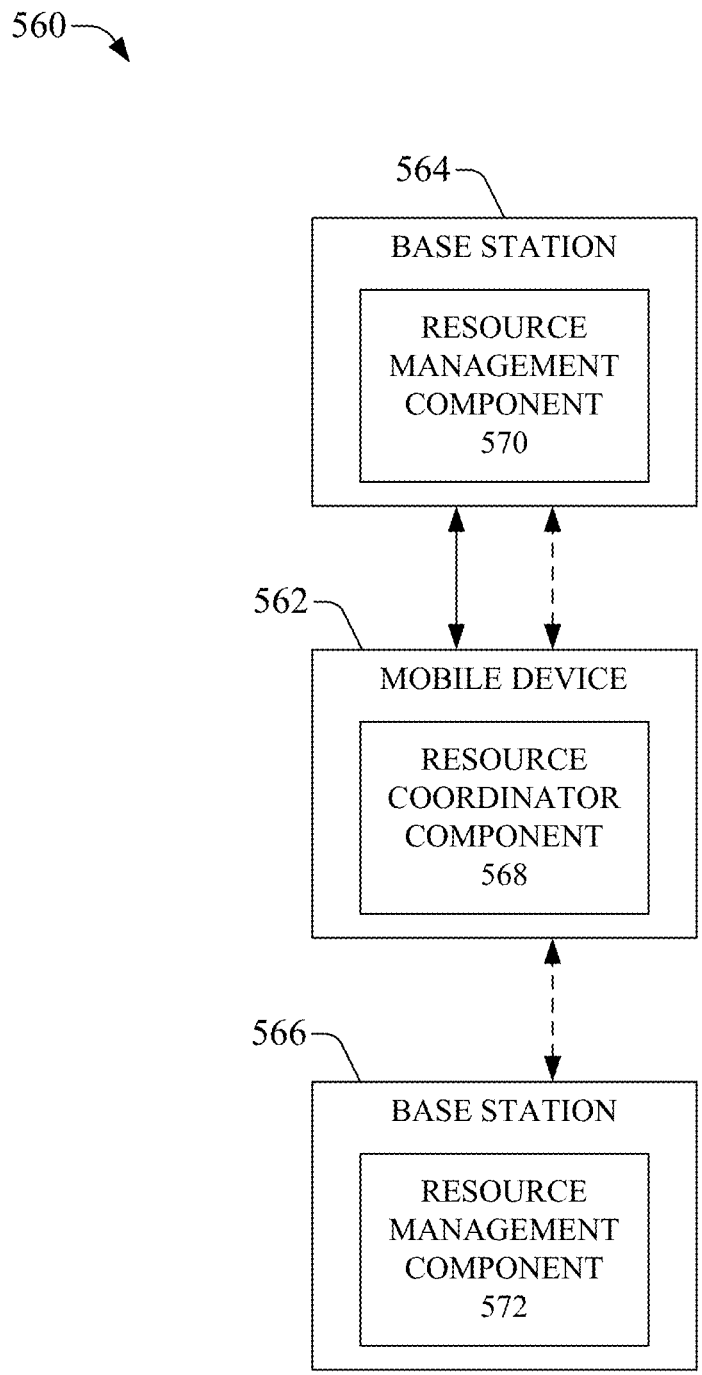
FIG. 5C depicts a block diagram of an example system that can facilitate communication of information between base stations utilizing an intermediary mobile device in accordance with an embodiment of the disclosed subject matter.

Referring to FIG. 5C, depicted is a block diagram of an example system 560 that can facilitate communication of information between base stations utilizing an intermediary mobile device in accordance with an embodiment of the disclosed subject matter. In an aspect, system 560 can comprise a mobile device 562 that can be connected (e.g., wirelessly connected) with a base station 564, which can be serving the mobile device 562 in a wireless communication environment. In an aspect, the mobile device 562 (e.g., mobile phone, computer with wireless communication functionality, . . . ) can be at cell edge in relation to the base station 564. In another aspect, system 560 can comprise another base station 566, which can be neighboring the base station 564 in the wireless communication environment. The subject innovation can establish an "echo" hop utilizing an intermediary mobile device 562 to facilitate efficient communication of data (e.g., user data, such as voice data, message data, Internet-related data, video-related data, audio-related data, etc., associated with mobile devices connected to the respective base stations; and/or control data) between the base station 564 and base station 566, for example, when the intermediary mobile device 562 is not being utilized or otherwise has resources available to be used to facilitate transmission of data between the base station 564 and base station 566.

In an aspect, the mobile device 562 can comprise a resource coordinator component 568 that can determine when the mobile device 562 is at cell edge in relation to the serving base station 564 (e.g., can determine that the radio path of mobile device 562 has degraded below a predefined signal threshold level that indicates the mobile device 562 is at cell edge in relation to the base station 564; can determine that margin between the synch channel signal strength of the mobile device 562 and base station 564 and the synch channel signal strength of the mobile device 562 and a neighbor base station (e.g., 566) falls within a predefined threshold level that indicates that the mobile device 562 is at cell edge in relation to base station 564). In another aspect, the base station 564 can comprise a resource management component 570 that can facilitate managing resources associated with the base station 564, and the base station 566 can comprise a resource management component 572 that can facilitate managing resources associated with the base station 566. The resource coordinator component 568 can transmit information, which can indicate that the mobile device 562 is at cell edge and/or signal strength of the mobile device 562, to the resource management component 570.

The base station 564 and base station 566 can desired to communicate data (e.g., user data associated with mobile devices respectively connected thereto; control data) between each other. Based at least in part on predefined resource criteria, the resource management component 570 can determine that it is desirable to utilize mobile device 562 as an intermediary device to communicate (e.g., wirelessly communicate) data between base station 564 and base station 566, as opposed to routing the data using transport resources of the base stations.

For example, the resource management component 570 can analyze the available transport resources of the base station 564 and/or can receive information regarding available transport resources of the base station 566 from resource management component 572, which can facilitate providing such information, and the resource management component 570 can determine that the available transport resources are below a predefined threshold level. The resource management component 570 also can evaluate the resource utilization level of the mobile device 562 to facilitate determining whether the mobile device 562 has available resources that can be utilized to communicate data packets between the base station 564 and base station 566. If the mobile device 562 is determined to have sufficient resources available based at least part on the predefined resource criteria, and the available transport resources are below the predefined threshold level, the resource management component 570 can determine that it is desirable to employ the mobile device 562 as an intermediary device to communicate data (e.g., user data, control data) between base station 564 and base station 566.

In an aspect, the resource management component 570 can transmit a command to the resource coordinator component 568 to instruct the mobile device 562 to establish an "echo" so that the mobile device 562 can be utilized to relay data from one base station to the other base station. The resource coordinator component 568 can configure the mobile device 562 to be utilized as an intermediary device to communicate data between base station 564 and base station 566. When the "echo" hop is established, the base station 564 and base station 566 can communicate data, or at least a portion of communicated data, to each other via the mobile device 562, instead of utilizing transport resources of the base stations. The subject innovation, by using the resources (e.g., wireless resources) of the mobile device 562 when such resources are available and when transport resources are limited or unavailable, can facilitate efficient communication of data between base station 564 and base station 566.

Figure 6:
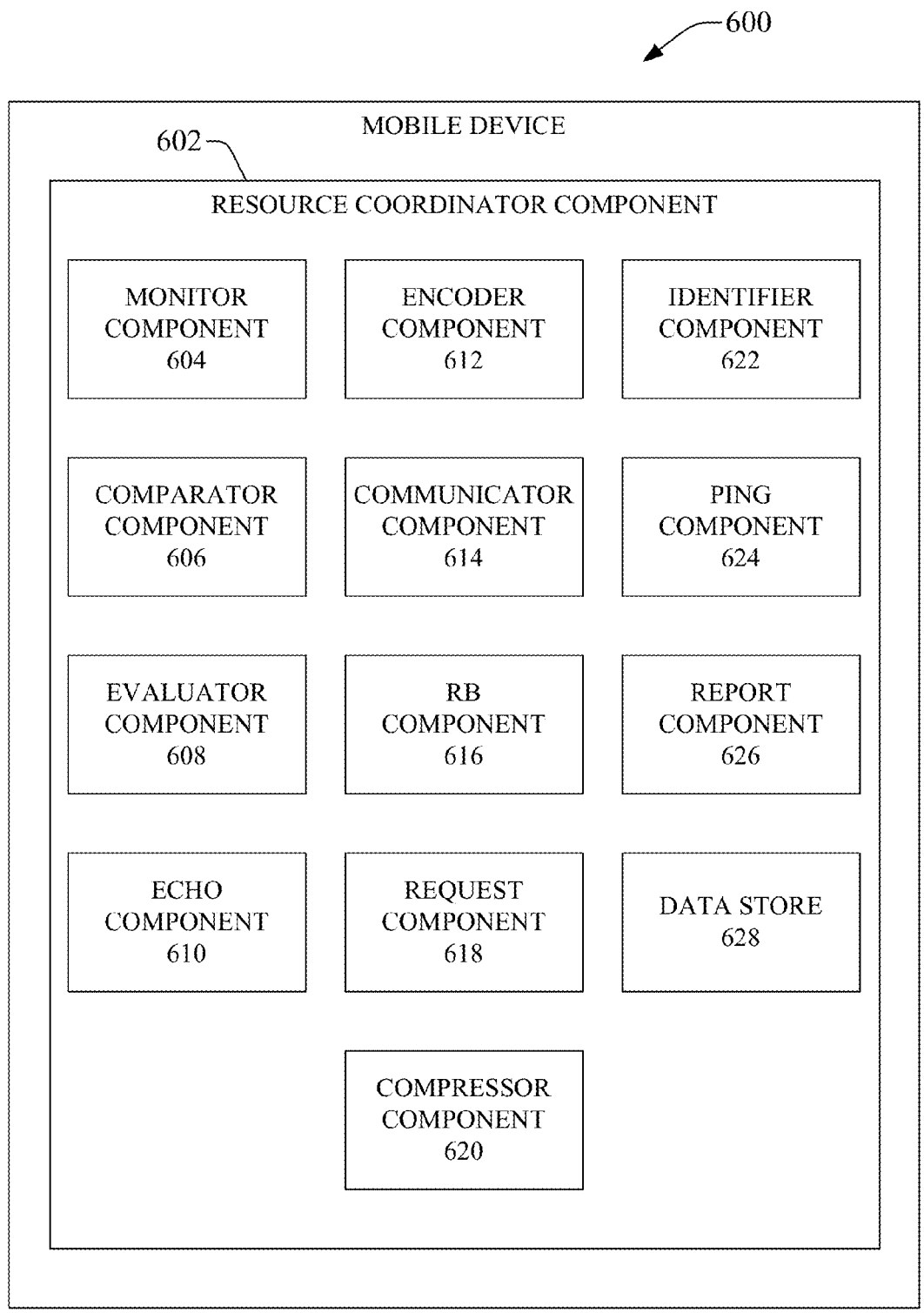
FIG. 6 illustrates a block diagram of a mobile device that can be utilized to facilitate efficient communication of information in a wireless network environment in accordance with various aspects and embodiments of the disclosed subject matter.

FIG. 6 is a block diagram of a mobile device 600 that can be utilized to facilitate efficient communication of information in a wireless network environment in accordance with various aspects and embodiments of the disclosed subject matter. In an aspect, the mobile device 600 can comprise a resource coordinator component 602 that can facilitate be utilized to facilitate coordinating resource use (e.g., RB reuse) in part by communicating information to base stations (e.g., serving base station 204 and/or neighbor base station 208). In an aspect, the resource coordinator component 602 can include a monitor component 604 that can be utilized to monitor the synch channel signal strength between the mobile device 600 and a base station (e.g., serving base station 204) and the synch channel signal strength between the mobile device 600 and neighbor base stations (e.g., neighbor base station 208).

In another aspect, the resource coordinator component 602 can contain a comparator component 606 that can be used to facilitate comparing respective synch channel signal strengths, such as the synch channel signal strength between the mobile device 600 and the serving base station (e.g., 204) and the synch channel signal strength between the mobile device 600 and a neighboring base station (e.g., 208), to facilitate determining a margin between the respective synch channel signal strengths. The resource coordinator component 602 can employ an evaluator component 608 that can evaluate information, such as information associated with the compared signal strengths, to facilitate determining whether the margin between the respective synch channel signal strengths meets a predefined threshold value deemed to indicate that the mobile device 600 is at cell edge (e.g., point deemed adequate to indicate mutual interference or potential interference).

In an embodiment, the resource coordinator component 602 can employ an echo component 610 that can be utilized to facilitate generating an "echo" transmission block that can comprise information, such as a list of RBs in use by the mobile device 600. The resource coordinator component 602 can utilize an encoder component 612 that can facilitate encoding data, such as information associated with the "echo" transmission block, which can be transmitted on the UL to a desired base station (e.g., neighbor base station 208) when the mobile device 600 is determined to be at cell edge. The resource coordinator component 602 also can include a communicator component 614 that can facilitate transmitting the "echo" transmission block on the UL to the desired base station (e.g., neighbor base station 208) to facilitate managing reuse of RBs.

In accordance with another embodiment, when the mobile device 600 is determined to be at cell edge, the echo component 610 can be utilized to generate a message that can comprise information, such as the signal strength associated with the mobile device and neighbor base station (e.g., 308) and RBs in use to the serving base station (e.g., 304) to facilitate managing RB reuse. The communicator component 614 can facilitate transmitting the message to the desired base station (e.g., serving base station 304), where the serving base station can utilize the received information to facilitate managing reuse of RBs.

In an aspect, the resource coordinator component 602 can include an RB component 616 that can facilitate using desired RBs as specified by a serving base station (e.g., 204, 304). For instance, if the serving base station indicates that the mobile device 600 is to utilize different RBs, the RB component 616 can facilitate changing the RBs used to the RBs specified by the serving base station.

In accordance with still another embodiment, the echo component 610 can facilitate using another mobile device (e.g., 506) as an intermediary to facilitate communication between the mobile device 600 and the serving base station (e.g., 504) via the intermediate mobile device (e.g., 506). In an aspect, the monitor component 602 can be utilized to monitor and/or measure the radio path between the mobile device 600 and serving base station (e.g., 504). The evaluator component 608 can be employed to facilitate determining whether the radio path between the mobile device 600 and the serving base station has degraded below predefined radio path limits, and can communicate the evaluation results to the echo component 610. When the radio path between the mobile device 600 and the base station has degraded below the predefined radio path limits, the echo component 610 can enter the mobile device 600 into "echo" mode.

In an aspect, the resource coordinator component 602 can include a request component 618 that can be utilized to transmit a request for a "ping" from all or at least a portion of other mobile devices (e.g., mobile device 506) being served by the base station. The base station can transmit commands to the other mobile devices to "ping" the mobile device 600. The monitor component 604 can be employed detect "pings" from other mobile devices. In an aspect, the resource coordinator component 602 can employ a compressor component 620 that can facilitate placing the mobile device 600 in a desired compressed mode (e.g., TDD mode) to facilitate halting transmission by the mobile device 600 while the mobile device 600 is monitoring other mobile devices to receive the "pings" from those other mobile devices. The evaluator component 608 and/or comparator component 606 can facilitate determining the mobile device that has the nearest acceptable "ping", such as the nearest acceptable "ping" to the serving base station. The resource coordinator component 602 can employ an identifier component 622 that can facilitate generating a message that can identify the mobile device having the nearest acceptable "ping". The communicator component 614 can facilitate transmitting the identifier message to the serving base station (e.g., 504) to facilitate establishing an echo hop using another mobile device as an intermediary between the mobile device 600 and the serving base station. The echo hop can be established to use the intermediary mobile device to communicate data between the mobile device 600 and the serving base station. If the intermediary mobile device becomes occupied with local traffic or its signal quality is such that it is a worse signal than the signal quality of the mobile device 600, the echo hop can be removed and a direct radio path between the mobile device 600 and serving base station can be re-established.

In accordance with yet another aspect, the echo component 610 can be employed to facilitate establishing an echo hop to use the mobile device 600 as an intermediary between another mobile device (e.g., distant mobile device associated with the serving base station) and the serving base station. In such instances, the echo component 610 can receive a request to "ping" another mobile device. The resource coordinator component 602 can employ a ping component 624 that can generate a "ping" that can be transmitted to another mobile device in response to the "ping" request. If the mobile device 600 is determined to have the nearest acceptable "ping" by the other mobile device, the serving base station (e.g., 504) can transmit a request for a signal quality report to the mobile device 600. In an aspect, the resource coordinator component 602 can employ a report component 626 that can generate a signal quality report of the mobile device 600 that can be transmitted to the serving base station using the communicator component 614. The serving base station can utilize the information in the signal quality report to determine whether the mobile device 600 has an acceptable UL and DL, and a superior UL and DL to the other mobile device.

If the mobile device 600 is selected by the serving base station as an intermediary device, the echo component 610 can facilitate establishing the mobile device 600 as an intermediary device. The mobile device 600 can receive a command to enter a desired compressed mode, and the compressor component 620 can place the mobile device 600 in the desired compressed mode. The echo component 610 can communicate with the other mobile device to facilitate establishing the echo hop. The echo component 610 can provide a confirmation message to the serving base station that indicates that the echo hop is established. When both mobile devices have confirmed, the serving base station can communicate data to another mobile device via the mobile device 600 and the other mobile device can communicate data to the serving base station via the mobile device 600. If the mobile device 600, as intermediary, becomes occupied with local traffic or its signal quality is such that it is a worse signal than the signal quality of the other mobile device, the echo hop can be removed and a direct radio path between the other mobile device and serving base station can be re-established.

In accordance with an aspect, the resource coordinator component 602 can comprise a data store 628 that can store information and/or code, which can facilitate operation of the mobile device 600, where the information and/or code can comprise, for example, information and/or code that can facilitate enabling the mobile device 600 to communicate with other communication devices, information and/or code that can facilitate coordinating resource (e.g., RB) use, information and/or code that can facilitate establishing an echo hop, etc. The data store 628 can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 628 is intended to comprise, without being limited to, these and any other suitable types of memory.

Figure 7:
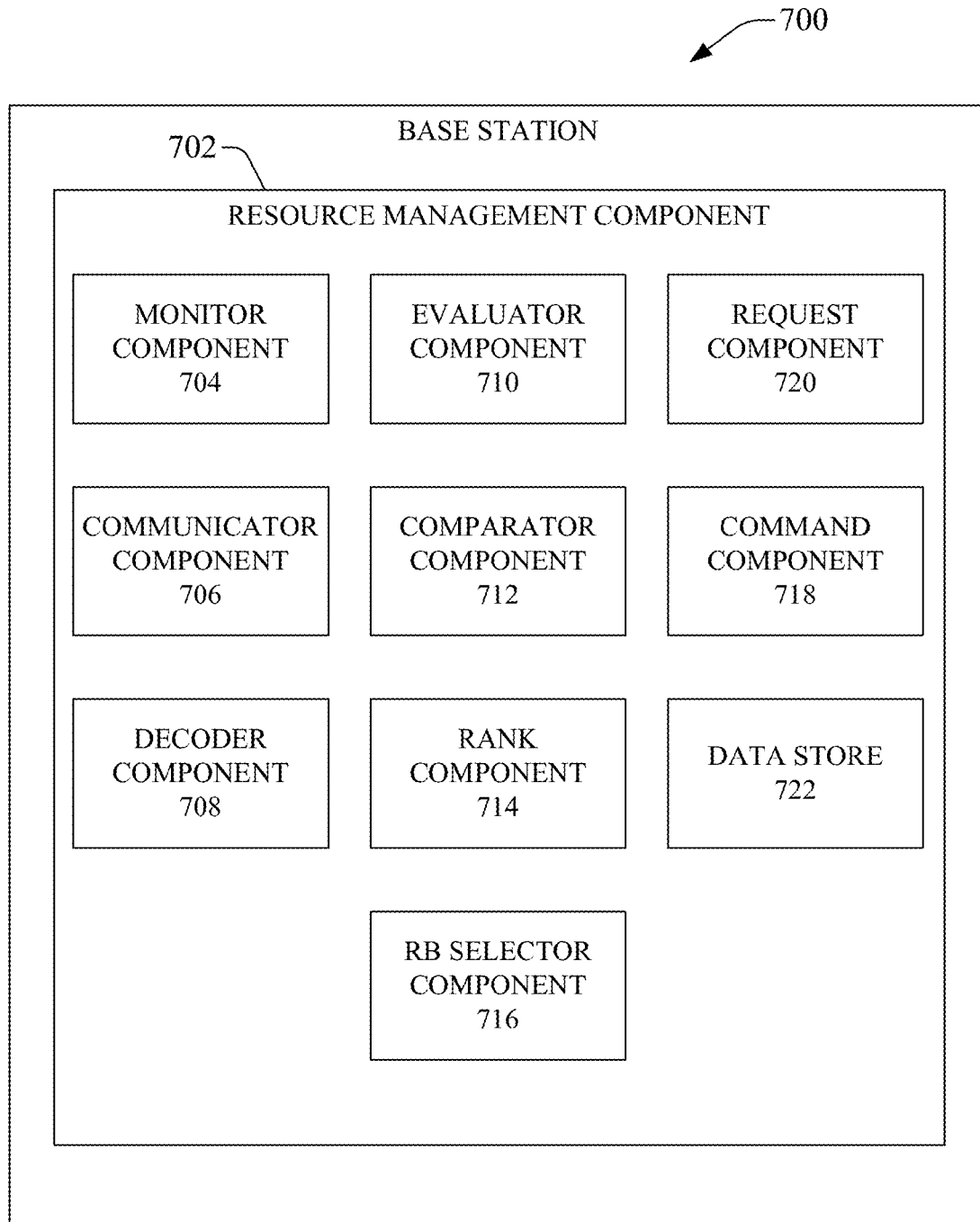
FIG. 7 depicts a block diagram of a base station that can be utilized to facilitate efficient communication of information in a wireless network environment in accordance with various aspects and embodiments of the disclosed subject matter.

Referring to FIG. 7, depicted is a block diagram of a base station 700 that can be utilized to facilitate efficient communication of information in a wireless network environment in accordance with various aspects and embodiments of the disclosed subject matter. In an aspect, the base station 700 can comprise a resource management component 702 that can be utilized to facilitate efficient use of resources associated with mobile devices and base stations in a wireless communication environment.

The resource management component 702 can include a monitor component 704 that can monitor mobile devices to facilitate detecting and receiving echo transmissions and/or other communications from mobile devices and/or communications from other base stations. The resource management component 702 also can include a communicator component 706 that can facilitate transmitting or receiving data from mobile devices and/or other base stations. In an aspect, the communicator component 706 can employ desired interfaces (e.g., X2 interface) to facilitate communication of information in the wireless network environment.

In another aspect, the resource management component 702 can contain a decoder component 708 that can be utilized to decode received information that is encoded, such as an encoded "echo" transmission block received from a mobile device. The resource management component 702 also can employ an evaluator component 710 that can evaluate echo signal strengths of mobile devices, signal quality of mobile devices, and/or other information to facilitate managing resources associated with mobile devices and base stations. The resource management component 702 also can utilize a comparator component 712 that can compare respective pieces of information (e.g., echo signal strengths) and can operate in conjunction with the evaluator component 710 to evaluate information.

In yet another aspect, the resource management component 702 can include a rank component 714 that can facilitate ranking or sorting RBs in ascending order of pertinent echo signal strength associated with the RBs and mobile devices utilizing the RBs. The resource management component 702 also can employ an RB selector component 716 that can facilitate selecting RBs for reuse. For instance, the RB selector component 716 can select a subset of RBs to be used by a mobile device, when at cell edge, based at least in part on the RBs associated with a mobile device having the weakest echo signal strength. The evaluator component 710 and/or comparator component 712 can facilitate determining which mobile device has the weakest echo signal strength and/or determining which RBs are associated with a mobile device having the weakest echo signal strength. Also, if there is a potential conflict in RBs between a mobile device at cell edge and another mobile device, the RB selector component 716 can be utilized to facilitate resolving the potential RB conflict in accordance with predefined resource criteria.

In still another aspect, the resource management component 702 can comprise a command component 718 that can generate commands that can be sent to mobile devices to command the mobile devices to perform an operation(s) specified in the command. The commands can relate to, for example, instructing mobile devices to provide a "ping" to another mobile device, instructing a mobile device to enter into a desired compressed mode, instructing a mobile device to report the mobile device having the nearest acceptable "ping", instructing mobile devices to initiate mobile device-to-mobile device communications, or instructing mobile devices to terminate mobile device-to-mobile device communications.

The resource management component 702 also can include a request component 720 that can generate requests that can be transmitted to the mobile devices, where the requests can include a request for a signal quality report from a mobile device to facilitate determining whether the mobile device is suitable as an intermediary for an echo hop. The request component 720 also can facilitate processing received requests, such as a request to have active or idle mobile devices, which are served by the base station 700, "ping" a mobile device that provided the request to the base station 700.

In accordance with an aspect, the resource management component 702 can comprise a data store 722 that can store information and/or code, which can facilitate operation of the base station 700, where the information and/or code can comprise, for example, information and/or code that can facilitate enabling the base station 700 to communicate with other base stations, mobile devices, or other communication devices, information and/or code that can facilitate managing resource (e.g., RB) use, information and/or code that can facilitate establishing an echo hop, etc. The data store 722 can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 722 is intended to comprise, without being limited to, these and any other suitable types of memory.

In accordance with one embodiment of the subject innovation, a base station (e.g., 204, 208, 304, 404, 504, 700) can utilize artificial intelligence (AI) methods to infer (e.g., reason and draw a conclusion based at least in part on a set of metrics, arguments, or known outcomes in controlled scenarios) as to what order the RBs should be ranked or sorted in order to facilitate RB reuse; whether an "echo" hop is to be established using one mobile device (e.g., intermediate mobile device) to facilitate communication by the base station with another mobile device (e.g., distant mobile device); etc. A mobile device (e.g., 202, 302, 402, 502, 600) can utilize AI methods to infer whether the mobile device is at cell edge; and/or identify a nearest acceptable "ping" to facilitate establishing an "echo" hop between a base station and the mobile device using an intermediate mobile device. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with a system (e.g., system 100, system 200, system 300, system 400, system 500) to facilitate rendering an inference(s) related to the system.

In particular, the base station (e.g., 204, 208, 304, 404, 504, 700) and/or mobile device (e.g., 202, 302, 402, 502, 600) can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with the system (e.g., system 100, system 200, system 300, system 400, system 500) to facilitate making inferences or determinations related to the system.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems described herein, example methodologies that can be implemented in accordance with the disclosed subject matter can be better appreciated with reference to flowcharts in FIGS. 8-16. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 8:
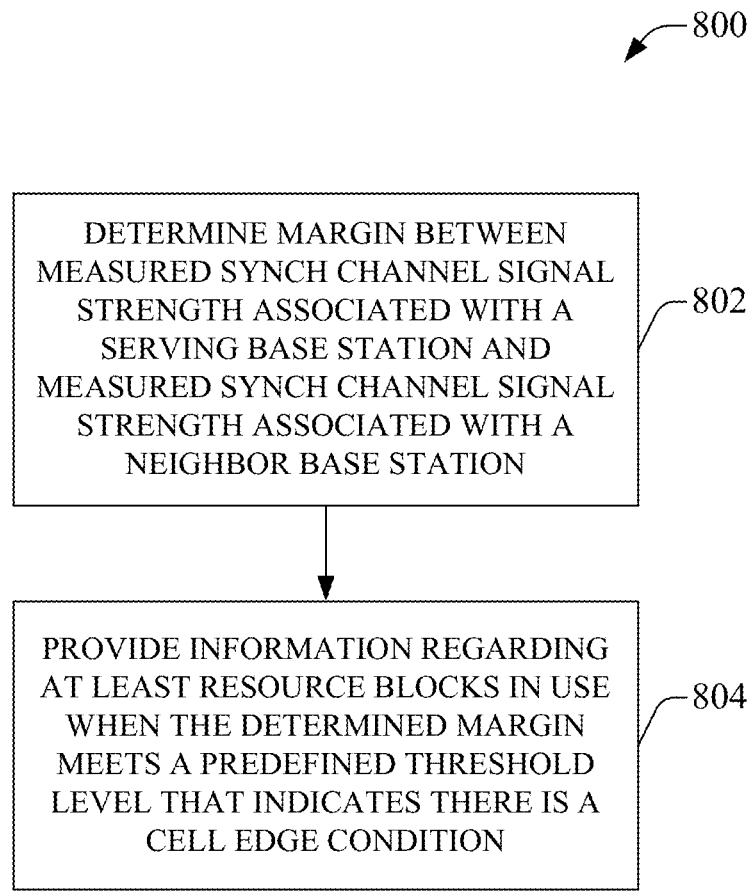
FIG. 8 depicts a flowchart of an example methodology that can facilitate managing resources associated with mobile devices and base stations in accordance with an aspect of the disclosed subject matter.

FIG. 8 depicts a flowchart of an example methodology 800 that can facilitate managing resources associated with mobile devices and base stations in accordance with an aspect of the disclosed subject matter. At 802, a margin between measured synch channel signal strength associated with a serving base station and measured synch channel signal strength associated with a neighbor base station can be determined. In an aspect, a mobile device (e.g., 202, 302) can facilitate measuring a synch channel signal strength between the mobile device and the base station serving the mobile device and measuring the respective synch channel signal strengths between the mobile device and neighboring base stations. The mobile device can calculate the margin between the measured synch channel signal strength between the mobile device and serving base station and the measured synch channel signal strength between the mobile device and a neighbor base station(s).

At 804, information regarding at least RBs in use can be provided when the determined margin meets a predefined threshold level that indicates there is a cell edge condition. In an embodiment, if and when the mobile device determines that the margin between respective synch channel signal strengths meets the predefined threshold level indicating that there is a cell edge condition, the mobile device can transmit an unencrypted and encoded "echo" transmission block on the UL to the neighboring base station associated with the cell edge condition of the mobile device, where the "echo" transmission block can include information indicating a list of RBs in use by the mobile device. The neighbor base station can utilize the received information, and other such information from other mobile devices at cell edge with the neighbor base station, and can evaluate such received information and respective "echo" signal strengths respectively associated with those mobile devices and their respective lists of RBs in use, to facilitate managing reuse of RBs. For example, the neighbor base station can sort RBs in ascending order based at least in part on pertinent "echo" signal strengths respectively associated therewith, and can first reuse DL RBs with the weakest "echo" signal strength for a mobile device at cell edge, and can first reuse UL RBs associated with the weakest "echo strength for a mobile device at cell edge.

In accordance with another embodiment, if and when the mobile device determines that the margin between respective synch channel signal strengths meets the predefined threshold level indicating that there is a cell edge condition, the mobile device can transmit a message to the base station serving the mobile device, where the message can include information identifying RBs in use by the neighbor base station and the synch channel signal strength associated with the neighbor base station associated with the cell edge condition of the mobile device. The serving base station can utilize the received information, and other such information from other mobile devices at cell edge with neighbor base stations, and can evaluate such received information and respective "echo" signal strengths respectively associated with those mobile devices in relation to respective neighbor base stations, to facilitate managing reuse of RBs. For example, the serving base station can sort RBs in ascending order based at least in part on pertinent "echo" signal strengths respectively associated with the mobile devices that reported respective RBs in use by respective neighbor base stations, and can first reuse DL RBs associated with the weakest "echo" signal strength for a mobile device at cell edge.

Figure 9:
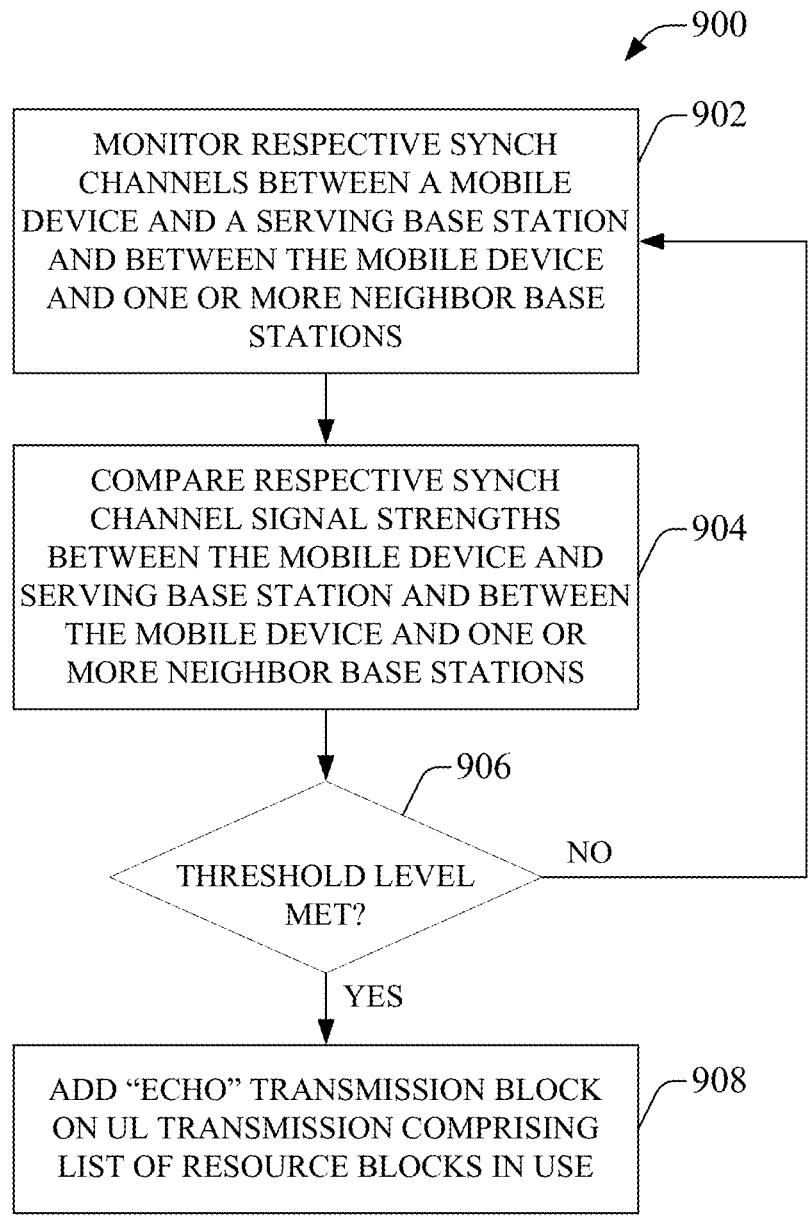
FIG. 9 depicts a flowchart of an example methodology that can facilitate managing resource block use in accordance with an aspect of the disclosed subject matter.

FIG. 9 presents a flowchart of an example methodology 900 that can facilitate managing RB use in accordance with an aspect of the disclosed subject matter. At 902, respective synch channels between a mobile device and a serving base station and between the mobile device and one or more neighbor base stations can be monitored. In an aspect, a mobile device (e.g., 202) can monitor its own synch channel with the serving base station and respective synch channels between the mobile device 202 and neighboring base stations (e.g., base station 208), to facilitate measuring the signal strength of its synch channel with the serving base station 204 and the respective synch channels signal strengths between the mobile device 202 and the neighboring base stations.

At 904, respective synch channel signal strengths between the mobile device and serving base station and between the mobile device and one or more neighbor base stations can be compared. In an aspect, the mobile device (e.g., 202) can compare its synch channel signal strength with the serving base station to the respective synch channels signal strengths between the mobile device and the neighbor base stations (e.g., 208). At 906, a determination can be made as to whether the margin between the synch channel signal strength between the mobile device and serving base station and the synch channel signal strength between the mobile device and a neighbor base station meets a predefined threshold value. For example, the mobile device 202 can calculate the difference between its synch channel signal strength with the serving base station and the synch channel signal strength between the mobile device and a neighbor base station to facilitate determining whether the margin between the synch channel signal strength with the serving base station 204 and the synch channel signal strength with a neighbor base station meets a predefined threshold value. If it is determined that the margin between the synch channel signal strength of the mobile device 202 with the serving base station 204 and the synch channel signal strength between the mobile device 202 and a neighbor base station 208 does not meet a predefined threshold value, methodology 900 can return to reference numeral 902, where the respective synch channels can be monitored.

If, at 906, it is determined that the margin between the synch channel signal strength of the mobile device with the serving base station and the synch channel signal strength between the mobile device and a neighbor base station meets a predefined threshold value, at 908, an "echo" transmission block can be added on the UL transmission to facilitate RB reuse between sectors (e.g., sector associated with base station 204 serving the mobile device 202; sector associated with neighboring base station 208 serving neighbor mobile device 204). For example, a neighbor base station 208 can receive and evaluate "echo" transmissions from the mobile device 202 and other mobile devices and can evaluate the respective "echo" transmissions to facilitate determining which DL RBs to reuse, and in what order to reuse them, and/or which UL RBs to reuse, and in what order to reuse them. In an aspect, the mobile device 202 can add the "echo" transmission block to the UL transmission, where the transmission block can comprise a list of RBs or subchannels in use by the mobile device 202. In another aspect, the mobile device 202 can heavily encode the "echo" transmission block and the transmission block can be unencrypted. The "echo" transmission block can be transmitted via any desired UL channel or a predefined "echo" UL channel, as desired.

Figure 10:
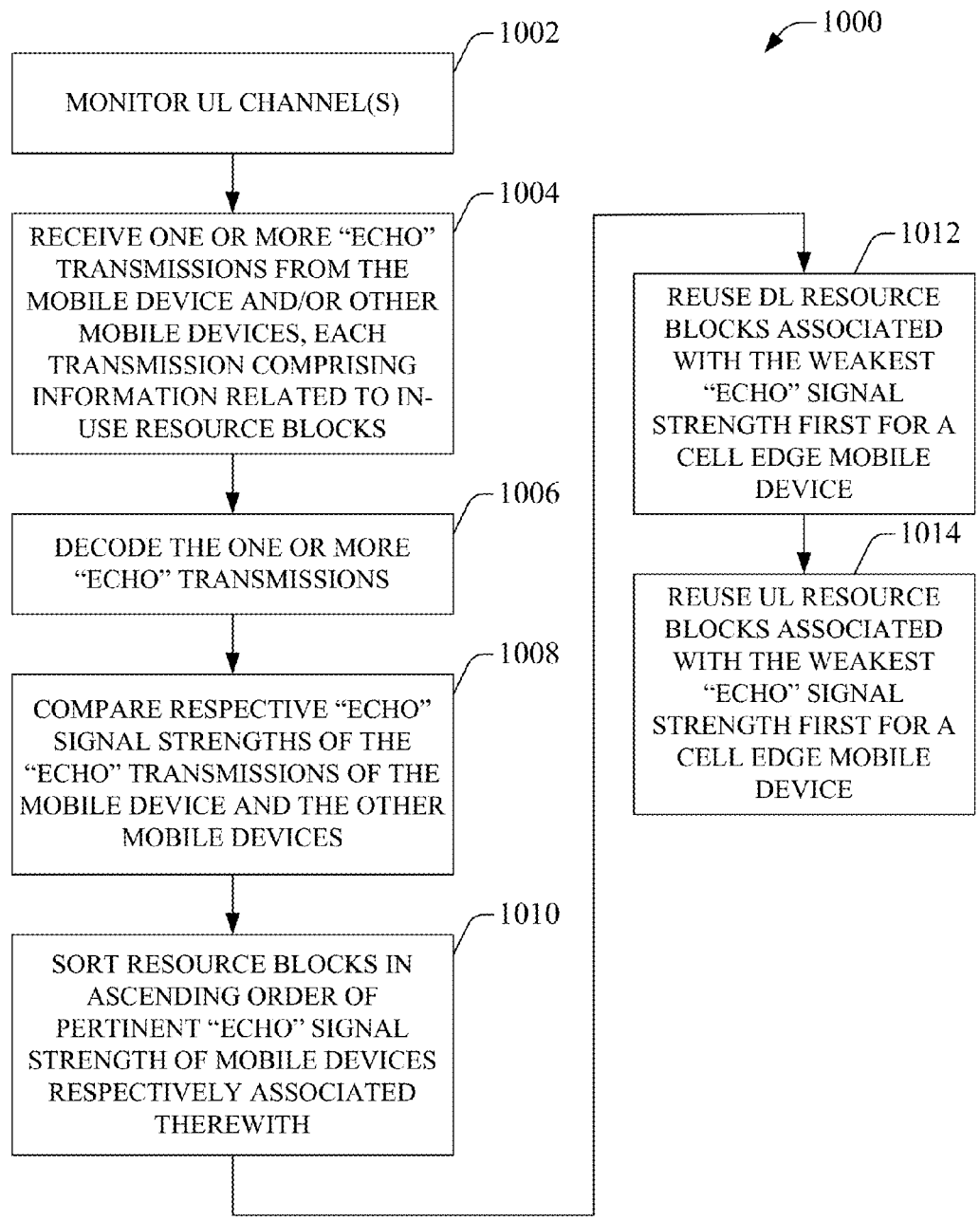
FIG. 10 illustrates a flowchart of an example methodology that can facilitate managing resource usage in accordance with an aspect of the disclosed subject matter.

FIG. 10 illustrates a flowchart of an example methodology 1000 that can facilitate managing resource usage in accordance with an aspect of the disclosed subject matter. At 1002, an UL channel(s) can be monitored. In an aspect, a neighbor base station (e.g., 208), which can be a base station that neighbors another base station serving the mobile device (e.g., 202) and/or other mobile devices, can monitor the UL channel(s) of the mobile devices and/or other mobile devices.

At 1004, one or more "echo" transmissions can be received from the mobile device and/or other mobile devices. In an aspect, the neighbor base station 208 can receive respective "echo" transmissions from the mobile device and/or other mobile devices that are detected or perceived or detected by the neighbor base station 208 via an UL channel. Each "echo" transmission can comprise a list of RBs or subchannels in use by the mobile device that sent the "echo" transmission block to the neighbor base station 208.

At 1006, each of the one or more "echo" transmissions can be decoded. In an aspect, the "echo" transmission from a mobile device (e.g., 202) can be heavily encoded. The neighbor base station 208 can decode the encoded "echo" transmissions of the mobile devices.

At 1008, the respective "echo" signal strengths of the "echo" transmissions of the mobile device and the other mobile devices can be compared to each other. In an aspect, the neighbor base station 208 can measure and compare the respective signal strengths of the "echo" transmissions of the mobile device and other mobile devices to each other to facilitate sorting the respective "echo" signal strengths relative to one another.

At 1010, respective RBs of the mobile device and the other mobile devices can be sorted in ascending order of pertinent "echo" signal strength based at least in part on respective "echo" signal strengths of the mobile device and RBs associated therewith and other mobile devices and RBs respectively associated therewith. In an aspect, the neighbor base station 208 can sort or rank RBs respectively associated with the mobile device 202 and other mobile devices in an ascending order of respective "echo" signal strengths for the mobile device and other mobile devices.

At 1012, the DL RB(s) associated with the weakest (e.g., lowest) "echo" signal strength can be reused first for a cell edge mobile device (e.g., 202). In an aspect, the neighbor base station 208 can reuse the DL RB(s) associated with the weakest "echo" signal strength first for a cell edge mobile device, where after the RB associated with the weakest "echo" signal strength is reused, the RB(s) of the remaining RBs that is associated with the weakest "echo" signal strength can be the next RB(s) that can be reused, and so on. In another aspect, other UL RBs can be used for non-cell edge mobile devices.

At 1014, UL RB(s) associated with the weakest (e.g., lowest) "echo" signal strength can be reused first for a cell edge mobile device (e.g., 202). In an aspect, the neighbor base station 208 can reuse the UL RB(s) with the weakest "echo" signal strength first for a cell edge mobile device, where after the RB(s) associated with the weakest "echo" signal strength is reused, the RB(s) of the remaining RBs that is associated with the weakest "echo" signal strength can be the next RB(s) that can be reused, and so on. In another aspect, other UL RBs can be used for non-cell edge mobile devices.

Figure 11:
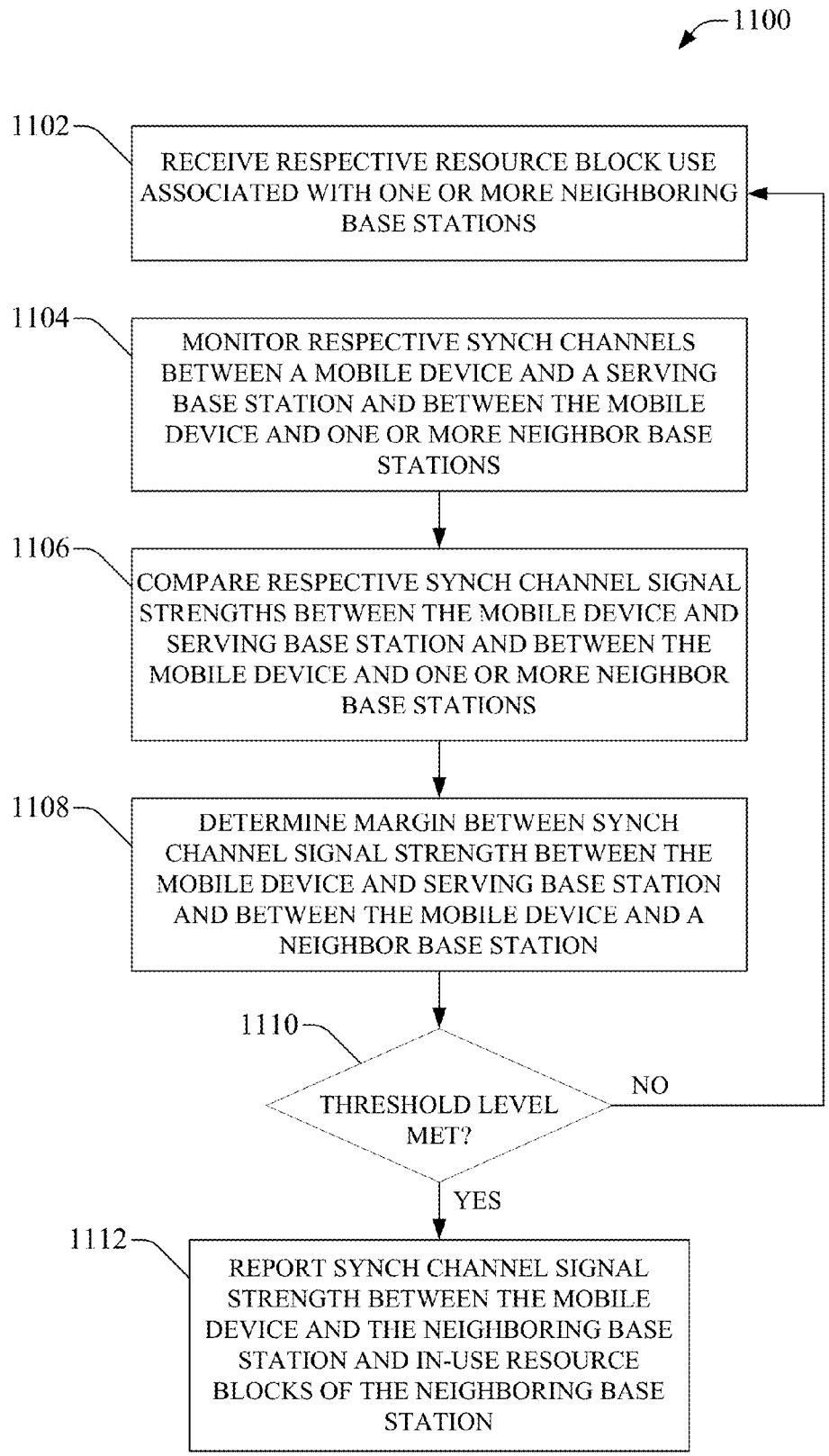
FIG. 11 illustrates a flowchart of an example methodology that can facilitate managing resources in accordance with an aspect of the disclosed subject matter.

FIG. 11 illustrates a flowchart of an example methodology 1100 that can facilitate managing resources in accordance with an aspect of the disclosed subject matter. At 1102, RB use associated with one or more neighboring base stations can be received. In an aspect, a base station 304 can be serving the mobile device 302 and/or other mobile devices. Neighboring base stations (e.g., 308) can be serving other mobile devices. Each base station can broadcast its actual RB or subchannel use with regard to respective mobile devices on an unencrypted DL bearer (e.g., full power). The mobile device 302 being served by the base station 304 can receive the respective broadcasts of RB use associated with the neighbor base stations (e.g., 308).

At 1104, a synch channel between a mobile device and a serving base station and respective synch channels between the mobile device and neighboring base stations can be monitored. In an aspect, a mobile device (e.g., mobile device 302) can monitor its synch channel with a base station 304 serving the mobile device 302 and the respective synch channels between the mobile device 304 and neighbor base stations 308.

At 1106, the synch channel signal strength between the mobile device and its serving base station can be compared to the respective synch channel signal strengths between the mobile device and neighboring base stations. In an aspect, the mobile device 302 can facilitate measuring the respective synch channel signal strengths of the mobile device 302 with its serving base station 304 and between the mobile device 302 and neighboring base stations (e.g., 308), and can compare its synch channel signal strength with the serving base station 304 to the synch channel signal strengths associated with the neighboring base stations. At 1108, a margin(s) between the synch channel signal strength between the mobile device and its serving base station and the synch channel signal strength between the mobile device and a neighboring base station(s) can be determined. In one aspect, the mobile device 302 can calculate or determine the margin between its synch channel signal strength with its serving base station 304 and the synch channel signal strength between the mobile device 302 and a neighboring base station(s) 308.

At 1110, a determination can be made as to whether the margin between the synch channel signal strength of the mobile device and its serving base station and the synch channel signal strength between the mobile device and a neighboring base station meets a predefined threshold value for deeming the mobile device at cell edge (e.g., point where the mobile device potentially can receive interference from the neighboring base station attempting to serve the mobile device using the same RBs as the serving base station serving the mobile device). For example, the mobile device 302 can calculate the difference between its synch channel signal strength with its serving base station 304 and each of the synch channel signal strength between the mobile device 302 and each neighboring base station (e.g., 308) to facilitate determining whether the margin between the synch channel signal strength of the mobile device 302 and its serving base station 304 and the synch channel signal strength between the mobile device 302 and a neighboring base station meets a predefined threshold value that can define the mobile device 302 to be at cell edge. If it is determined that the margin does not meet a predefined threshold value, methodology 1100 can return to reference numeral 1102, where RB use associated with one or more neighboring base stations can be received, and methodology 1100 can continue from that point.

If, at 1110, it is determined that the margin meets a predefined threshold value for deeming the mobile device to be at cell edge, at 1112, the synch channel signal strength between the mobile device and the neighboring base station and in-use RBs of the neighboring base station can be reported to the serving base station. In an aspect, the mobile device 302 can transmit a message reporting the synch channel signal strength between the mobile device 302 and the neighboring base station 308, and the in-use RBs of the neighboring base station 308, to the base station 304 serving the mobile device 302, when the margin meets the predefined threshold level. The serving base station 304 can receive the report and can utilize the information in the report to facilitate determining which RBs can be reused first for a cell edge mobile device 302 (e.g., as more fully described herein with regard to methodology 1200).

Figure 12:
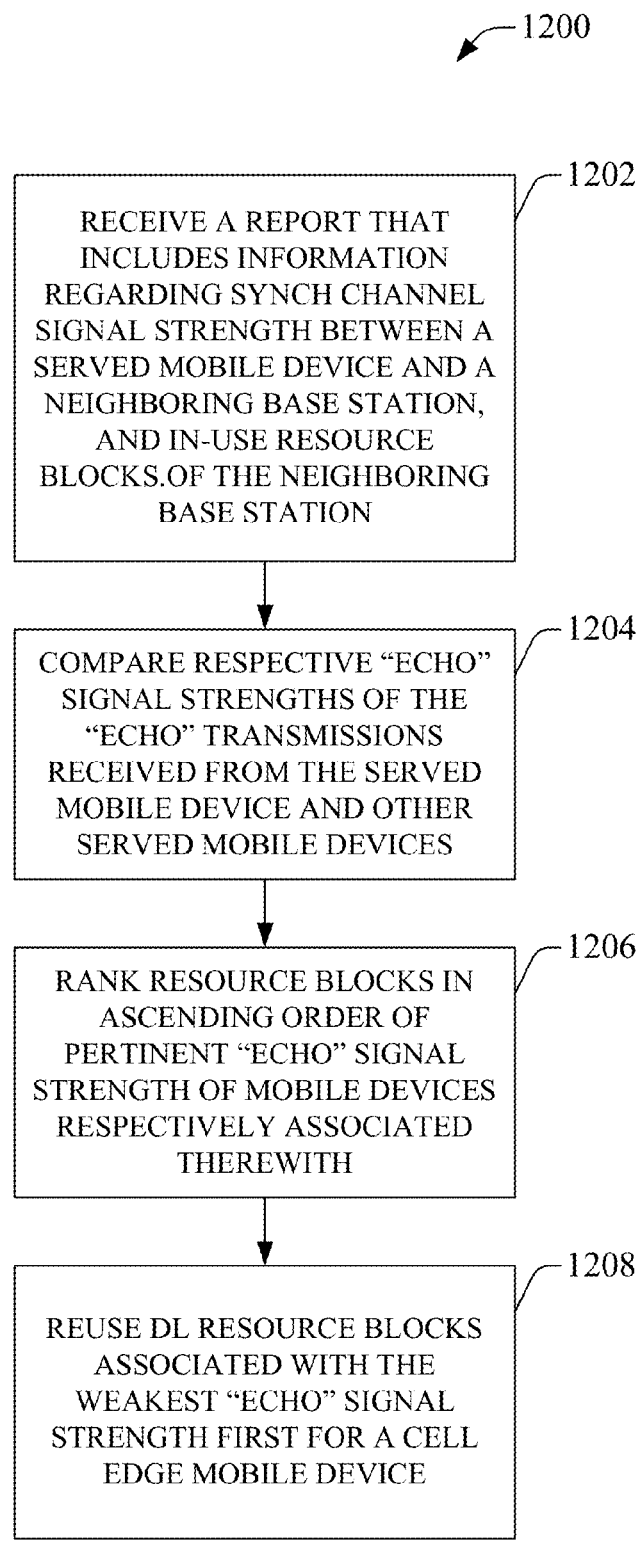
FIG. 12 depicts a flowchart of an example methodology that can facilitate managing resources in accordance with an aspect of the disclosed subject matter.

FIG. 12 depicts a flowchart of an example methodology 1200 that can facilitate managing resources in accordance with an aspect of the disclosed subject matter. At 1202, a report that includes information regarding a synch channel signal strength between mobile device (e.g., a mobile device 302 that is being served by base station 304) and a neighboring base station, and in-use RBs of the neighboring base station, can be received. In one aspect, a base station 304 that is serving the mobile device 302 can receive the report (e.g., via message) from the mobile device 302.

At 1204, the respective "echo" signal strengths received from the mobile device and the other mobile devices can be compared to each other. In an aspect, the serving base station 304 can measure and compare the respective "echo" signal strengths the mobile device and other mobile devices, which are served by the base station 304, to each other to facilitate ranking the respective "echo" signal strengths relative to one another.

At 1206, the DL RBs can be ranked in ascending order based at least in part on the pertinent "echo" signal strengths respectively associated with the DL RBs. In one aspect, the serving base station 304 can facilitate ranking the DL RBs in ascending order of pertinent "echo" signal strengths respectively associated with the DL RBs and mobile devices respectively associated with the DL RBs. The "echo" signal strength can be an indication of path loss between potential interfering sectors. In an aspect, to facilitate determining "echo" signal strengths of a mobile device associated with a DL RBs, multiple measurements of signal strength can be averaged, or multiple measurements can be filtered to identify a maximum signal strength or a number of desired measurements of signal strength, etc., as desired.

At 1208, the DL RB(s) associated with the weakest "echo" signal strength can be reused first with regard to a mobile device that is at cell edge. In an aspect, the serving base station 304 can first reuse the DL RB(s), which is associated with a mobile device that is determined to have the weakest (e.g., lowest) "echo" signal strength, for a cell edge mobile device (e.g., 302). In another aspect, the serving base station 304 can use other DL RBs for non-cell edge mobile devices served by the base station 304.

Figure 13:
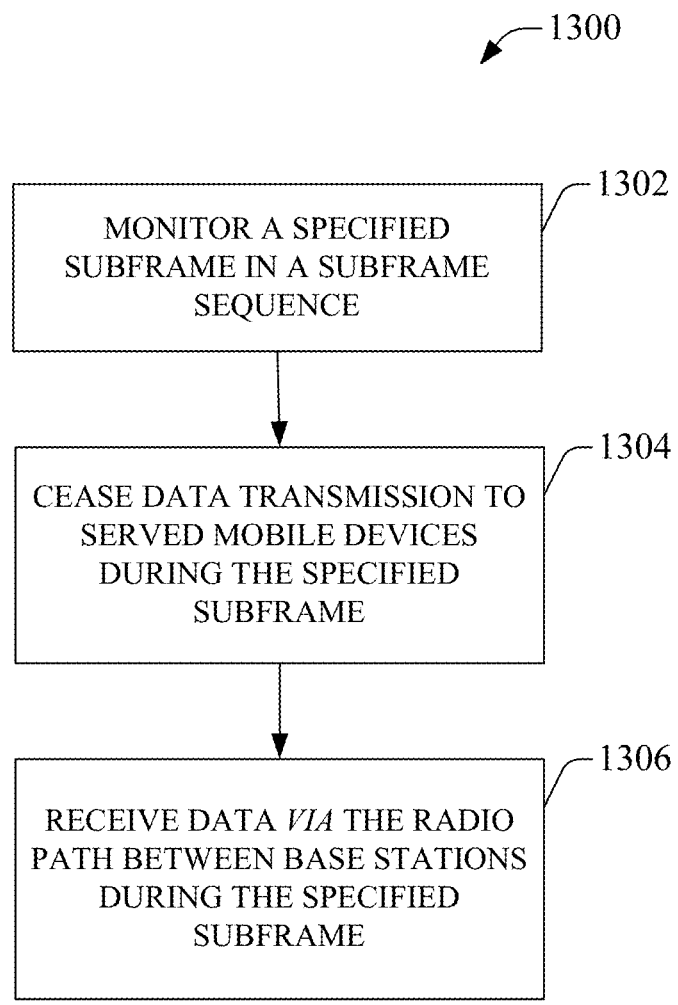
FIG. 13 illustrates a flowchart of an example methodology that can facilitate over-the-air wireless communication of data between base stations in accordance with an aspect of the disclosed subject matter.

FIG. 13 illustrates a flowchart of an example methodology 1300 that can facilitate over-the-air wireless communication of data between base stations in accordance with an aspect of the disclosed subject matter. The subject innovation can be utilized to establish a direct over-the-air (OTA) wireless radio path between base stations. The subject innovation can be employed, for example, to facilitate load sharing between over-the-air radio resources and transport resources, where, for instance, available radio resources (e.g., RBs) can be utilized when no transport resources or limited transport resources are available back towards the core network.

At 1302, a specified subframe in a subframe sequence can be monitored. In an aspect, a base station can establish an OTA wireless radio path with another base station and can monitor an interface between it and another base station during the specified subframe in a subframe sequence to facilitate detecting and receiving data from the other base station during the period of time the specified subframe occurs. In another aspect, a sequence of subframes can be structured, such that all subframes, except for a specified number (e.g., 1) of subframes, can be blanked. The base station can be configured to monitor the interface (e.g., X2 interface) during the specified subframe. During the blanked subframes, the base station can be serving mobile devices connected thereto. In accordance with an embodiment, for each base station, a mobile device associated with each base station can be configured as an "X2 modem" with direct interconnection to the BBU scheduler.

At 1304, data transmission to served mobile devices can be ceased during the specified subframe. In an aspect, the base station that is receiving the data from another base station via the interface can cease transmission of data to mobile devices served by the base station during the time period of the specified subframe.

At 1306, data can be received via the radio path between base stations during the specified subframe. In an aspect, the base station can receive data (e.g., voice traffic, data traffic, control information) via the OTA radio path between it and the other base station during the time period of the specified subframe in the subframe sequence.

Figure 14:
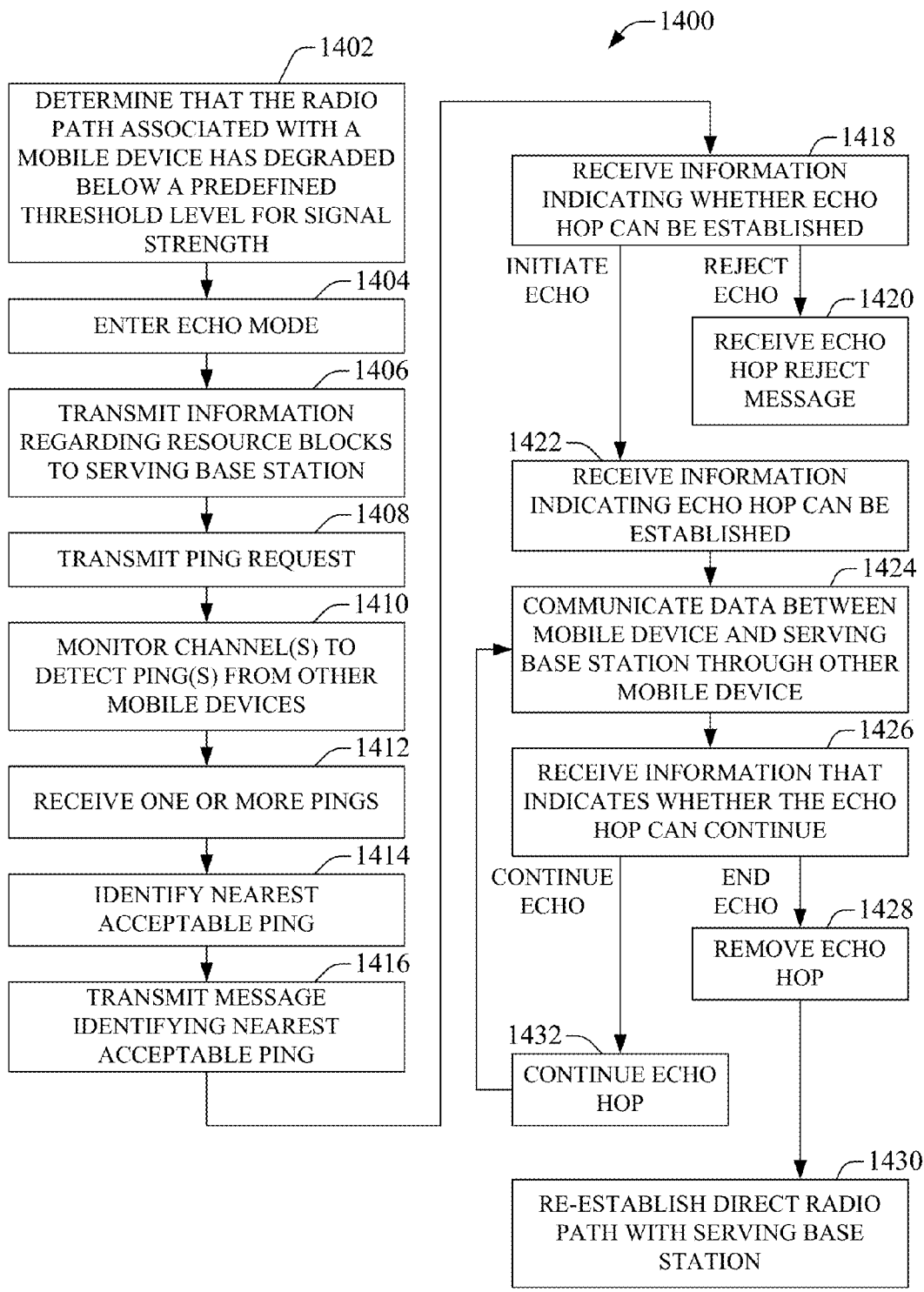
FIG. 14 depicts a flowchart of an example methodology that can facilitate communication between a mobile device and a base station by utilizing another mobile device as an intermediary in accordance with an embodiment of the disclosed subject matter.

FIG. 14 depicts a flowchart of an example methodology 1400 that can facilitate communication between a mobile device and a base station by utilizing another mobile device as an intermediary in accordance with an embodiment of the disclosed subject matter. At 1402, it can be determined that a radio path associated with a mobile device has degraded below a predefined threshold level for signal strength. In an aspect, the mobile device 502 can monitor the radio path between the mobile device 502 and the serving base station 504, and can determine that the radio path has degraded below the predefined threshold level for signal strength.

At 1404, the mobile device can enter "echo" mode based at least in part on the determination that the radio path associated with the UE has degraded below the predefined threshold level. In an aspect, the mobile device 502 can enter "echo" mode to facilitate initiating the process of using another mobile device as an intermediary.

At 1406, information regarding RBs in use by the mobile device can be transmitted to the serving base station. The mobile device 502 can transmit information indicating the RBs in use by the mobile device 502 to the serving base station 504. At 1408, a ping request can be transmitted to the serving base station to request "pings" from all other mobile devices served by the serving base station. In an aspect, the mobile device 502 can transmit a request, which can request a ping from all other mobile devices (e.g., mobile device 506) served by the base station 504, to the serving base station 504. The serving base station 504 can transmit or broadcast a command to each of the other mobile devices (e.g., active mobile devices and idle mobile devices) that are being served by the base station 504, where the command can direct each of the other mobile devices, including mobile device 506, to ping the mobile device 502.

At 1410, a channel(s) can be monitored to facilitate detecting or receiving a ping from other mobile devices. The mobile device 502 can monitor a channel(s) to facilitate detecting or receiving pings from the other mobile devices, such as mobile device 506. In an aspect, the mobile device 502 can enter a "compressed" or TDD mode to facilitate halting its own transmissions while monitoring for pings from the other mobile devices.

At 1412, one or more pings can be received from one or more other mobile devices associated with the serving base station. In an aspect, the mobile device 502 can receive respective pings from one or more other mobile devices, including, mobile device 506, associated with the same serving base station 504 as the mobile device 502. At 1414, one of the other mobile devices that has provided a ping that is nearest acceptable ping can be identified or determined. In an aspect, the mobile device 502 can evaluate the received pings from the other mobile devices and can identify one of the other mobile devices that has a ping which indicates that such other mobile device (e.g., 506) is the nearest to the serving base station 504.

At 1416, a message identifying the other mobile device, which is identified as having the nearest acceptable ping, can be transmitted to the serving base station. The mobile device 502 can transmit a message that includes information that can identify the other mobile device (e.g., 506) having the nearest acceptable ping for the serving base station 504, and the message can be received by the serving base station 504. The serving base station 504 can utilize this information to facilitate setting up an echo hop if other criteria are met. The serving base station can request a signal quality report from the other mobile device 506 to facilitate determining whether the UL and DL associated with the other mobile device 506 are acceptable and superior to the respective UL and DL associated with mobile device 502.

At 1418, information indicating whether an echo hop can be established can be received. If the DL and UL associated with the other mobile device are not acceptable and/or are not superior to the DL and UL associated with the mobile device, at 1420, information indicating that the echo hop is rejected can be received. In an aspect, the serving base station 504 can transmit an echo reject message to the mobile device 502 to indicate that the echo hop is rejected. If it is determined that the DL and UL associated with the other mobile device is acceptable and is superior to the DL and UL associated with the mobile device, at 1422, information indicating that the echo hop can be established can be received. In an aspect, the serving base station 504 can transmit a message to the other mobile device 506 to indicate that the echo hop can be established and instructing the other mobile device 506 to initiate mobile device-to-mobile device communications with the mobile device 502. The mobile device 502 can receive a message from the other mobile device 506 to indicate that the echo hop can be set up. In another aspect, the other mobile device 506 can enter a desired compressed mode (e.g., TDD mode) to facilitate preventing de-sense by the mobile device 506 with its own transmitter.

At 1424, data can be communicated between the mobile device and serving base station through the other mobile device. In an aspect, when the mobile devices 502 and 506 confirm, to the serving base station 504, that the mobile device-to-mobile device communication connection is established, the other mobile device 506 can be an intermediary device that can be used to pass through data (e.g., receive and re-transmit data) to/from the mobile device 502 from/to the serving base station 504.

At 1426, information that indicates whether the echo hop can continue can be received. In an aspect, the mobile device 502 can receive information that indicates whether the echo hop can continue from the serving base station 504. If the other mobile device 506 becomes occupied with local traffic and/or the quality of the radio path associated with the other mobile device 506 is of lower quality than the direct radio path between the mobile device 502 and the serving base station 504, the serving base station 504 can determine that the echo hop is to be removed and a direct radio path between the mobile device 502 and serving base station 504 is to be re-established. In such instance, the serving base station 504 can transmit a message to the mobile device 502 to indicate that the echo hop is to be removed and the direct radio path with the base station 504 is to be re-established.

If the received information indicates that the echo hop is to be removed, at 1428, the echo hop can be removed. In an aspect, the mobile device 502 can facilitate removing the echo hop associated with the other mobile device 506. At 1430, a direct radio path between the mobile device and serving base station can be re-established. In an aspect, the mobile device 502 can facilitate re-establishing the direct radio path with the serving base station 504 to continue to data communication between the mobile device 502 and the serving base station 504. If, at 1426, the received information indicates that the echo hop can continue (or if no information is received that indicates that the echo hop is to be terminated), at 1432, the echo hop can continue. At this point, methodology 1400 can return to reference numeral 1424, where data can continue to be communicated between the mobile device and serving base station through the other mobile device, and methodology 1400 can proceed from that point.

Figure 15:
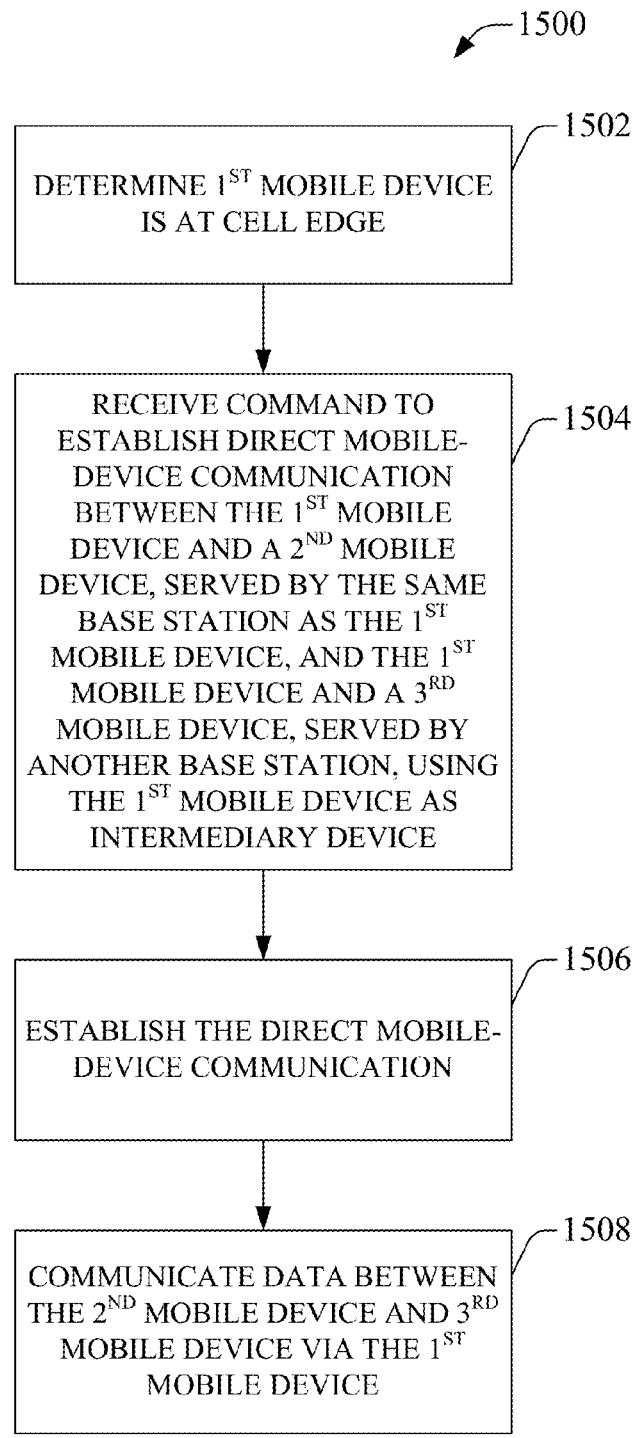
FIG. 15 illustrates a flowchart of an example methodology that can facilitate communication between two mobile devices by utilizing another mobile device as an intermediary device in accordance with an embodiment of the disclosed subject matter.

FIG. 15 illustrates a flowchart of an example methodology 1500 that can facilitate communication between two mobile devices by utilizing another mobile device as an intermediary device in accordance with an embodiment of the disclosed subject matter. In an aspect, a mobile device can be employed as an intermediary device between two other mobile devices to facilitate communicating data (e.g., relaying data) between the two other devices when the mobile device has resources available based at least in part on predefined resource criteria (e.g., the mobile device is sitting idle or is not utilizing more than a predefined threshold amount of resources). At 1502, a determination can be made that a first mobile device is at cell edge. In an aspect, the first mobile device (e.g., 536) can determine that it is at cell edge in relation to the base station that is serving the first mobile device.

At 1504, a command can be received, wherein the command instructs the first mobile device to establish direct mobile-device communication between the first mobile device and a second mobile device (e.g., 536), which is served by the same base station as the first mobile device, and between the first mobile device and a third mobile device (e.g., 538), which is served by another base station, to facilitate employing the first mobile device as an intermediary device to communicate data (e.g., user data, control data) between the second mobile device and third mobile device. In an aspect, the first mobile device (and/or the second mobile device and/or third mobile device) can receive a command from its serving base station instructing the first mobile device to initiate direct mobile-device communications with the second mobile device and third mobile device.

At 1506, the direct mobile-device communication can be established. In an aspect, the first mobile device, second mobile device, and third mobile device can communicate with each other to facilitate setting up direct mobile-device communications with each other. The mobile devices can transmit confirmation messages to their respective base stations to confirm that the direct mobile-device communication link is established, so that the base stations are aware that the mobile devices will be communicating directly using the first mobile device as an intermediary device.

At 1508, data can be communicated between the second mobile device and the third mobile device via the first mobile device. In an aspect, data can be received by the first mobile device from the second mobile device or third mobile device and relayed to the other of the second mobile device or third mobile device to facilitate communicating data between the second mobile device and third mobile device using direct mobile-device communications, as opposed to using the transport resources of the base stations, which can allow the transport resources to be utilized for other desired purposes.

Figure 16:
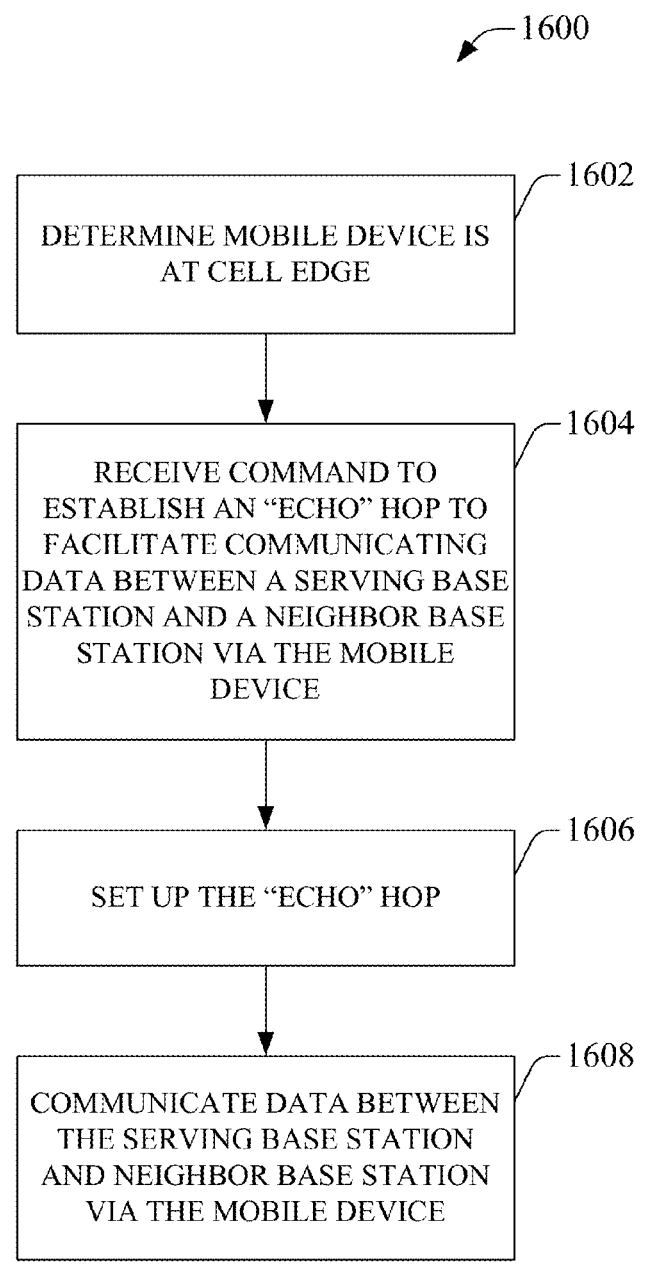
FIG. 16 illustrates a flowchart of an example methodology that can facilitate communication between two base stations by utilizing a mobile device as an intermediary device in accordance with an embodiment of the disclosed subject matter.

FIG. 16 illustrates a flowchart of an example methodology 1600 that can facilitate communication between two base stations by utilizing a mobile device as an intermediary device in accordance with an embodiment of the disclosed subject matter. In an aspect, a mobile device (e.g., 562) can be employed as an intermediary device between a base station (e.g., 564), which is serving the mobile device, and another base station (e.g., 566) that neighbors the serving base station to facilitate communicating data (e.g., relaying data) between the two base stations when the mobile device has resources available based at least in part on predefined resource criteria (e.g., the mobile device is sitting idle or is not utilizing more than a predefined threshold amount of resources). At 1602, a determination can be made that a first mobile device is at cell edge. In an aspect, the mobile device can determine that it is at cell edge in relation to the base station that is serving the first mobile device.

At 1604, a command can be received, wherein the command can instruct the mobile device to establish an "echo" hop to facilitate communicating data between the serving base station and the neighbor base station. In one aspect, the serving base station can transmit a command to the mobile device instructing the mobile device to configure itself to operate as an intermediary device that can receive data from one base station and can relay the data to the other base station.

At 1606, the "echo" hop can be set up. In an aspect, the mobile device can set up the echo hop so that the mobile device can be utilized as an intermediary device between the serving base station and neighbor base station.

At 1608, data (e.g., user data, control data) can be communicated between the serving base station and a neighbor base station via the mobile device. In an aspect, data can be communicated from the serving base station or the neighbor base station and can be received by the mobile device, which can relay (e.g., re-transmit) that data to the other of the serving base station or the neighbor base station to facilitate communicating data between the base stations without utilizing transport resources of the base stations.

Figure 17:
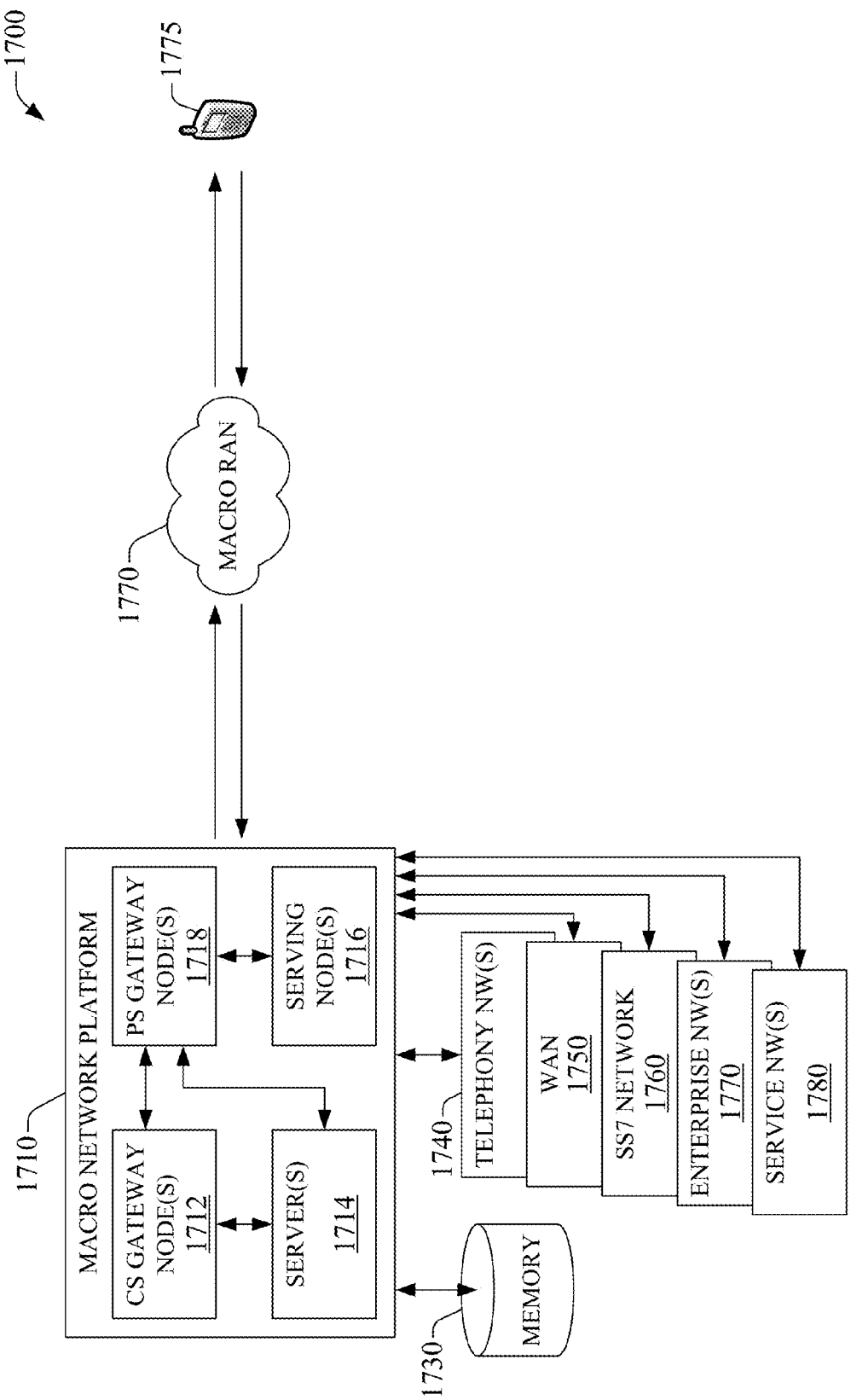
FIG. 17 depicts a block diagram of example macro wireless network environment in accordance with various aspects of the disclosed subject matter.
Figure 18:
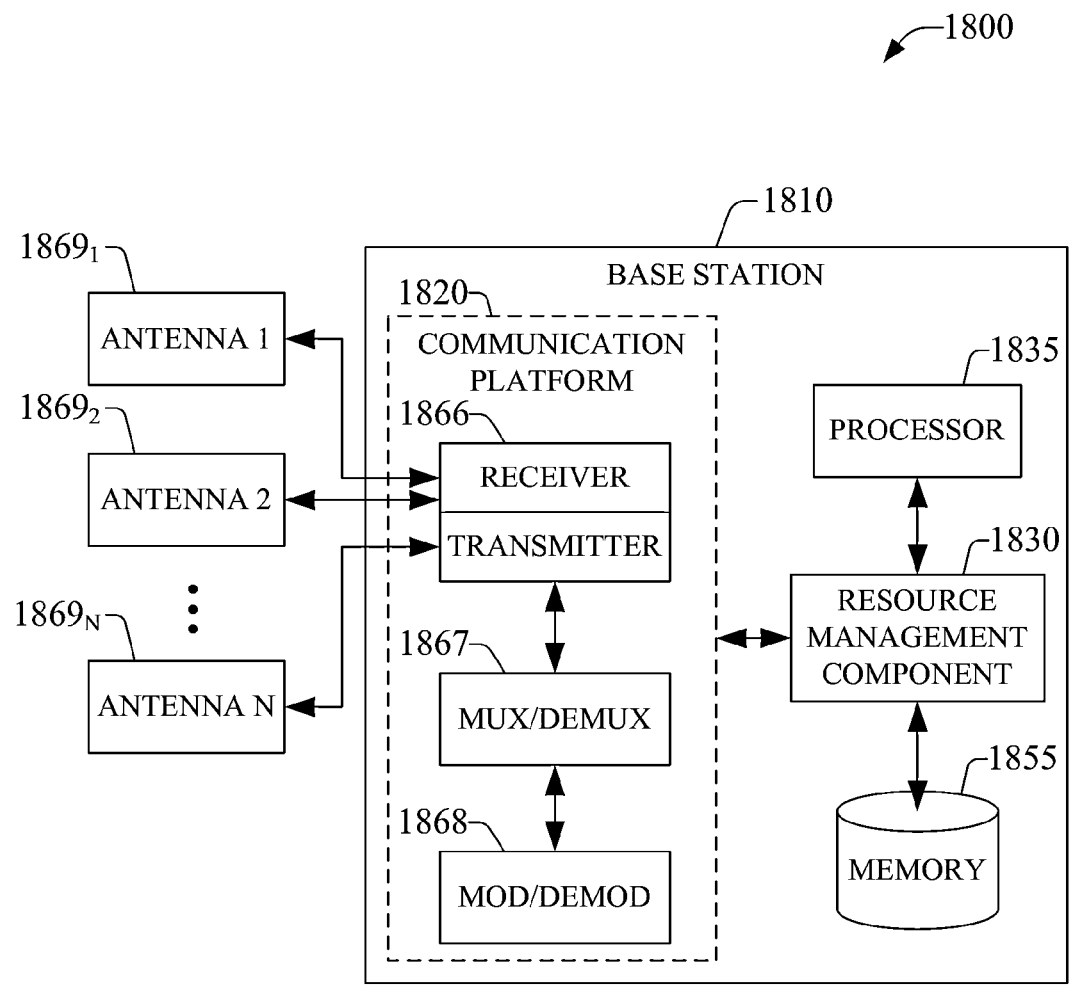
FIG. 18 is a block diagram of an example base station that operates in accordance with aspects disclosed in the subject specification.

To provide further context for various aspects of the subject specification, FIG. 17 and FIG. 18 illustrate, respectively, an example macro wireless network environment and a block diagram of an example embodiment of a base station that can enable and exploit features or aspects of the subject innovation and that utilize aspects of the subject innovation in accordance with various aspects of the subject specification.

With respect to FIG. 17, wireless communication environment 1700 can comprise a wireless network platform, such as a macro network platform 1710 which can serve or can facilitate communication with user equipment 1775 (e.g., mobile device 120$_A$) via a macro radio access network (RAN) 1770. It should be appreciated that in cellular wireless technologies (e.g., 3GPP UMTS, HSPA, 3GPP LTE, 3GPP2 UMB), macro network platform 1710 can be embodied in a Core Network. It is noted that RAN 1770 can include a base station(s), or an access point(s), and its associated electronic circuitry and deployment site(s), in addition to a wireless radio link operated in accordance with the base station(s). Accordingly, macro RAN 1770 can comprise various coverage cells like cell 105.

Generally, the macro network platform 1710 can include components, e.g., nodes, gateways, interfaces, servers, or platforms, that can facilitate both packet-switched (PS) (e.g., internet protocol (IP), frame relay, asynchronous transfer mode (ATM)) and circuit-switched (CS) traffic (e.g., voice and data) and can control generation for networked wireless communication. In an aspect of the subject innovation, macro network platform 1710 can include Circuit switched (CS) gateway node(s) 1712 which can interface CS traffic received from legacy networks like telephony network(s) 1740 (e.g., public switched telephone network (PSTN), or public land mobile network (PLMN)) or a SS7 network 1760. CS gateway 1712 can authorize and authenticate traffic (e.g., voice) arising from such networks. Additionally, CS gateway 1712 can access mobility, or roaming, data generated through SS7 network 1760; for instance, mobility data stored in a VLR, which can reside in memory 1730. Moreover, CS gateway node(s) 1712 interfaces CS-based traffic and signaling and gateway node(s) 1718. As an example, in a 3GPP UMTS network, PS gateway node(s) 1718 can be embodied in gateway GPRS support node(s) (GGSN).

In addition to receiving and processing CS-switched traffic and signaling, PS gateway node(s) 1718 can authorize and authenticate PS-based data sessions with served (e.g., through macro RAN 1770) wireless devices. Data sessions can include traffic exchange with networks external to the macro network platform 1710, like wide area network(s) (WANs) 1750, enterprise networks (NW(s)) 1770 (e.g., enhanced 911), or service NW(s) 1780 like IP multimedia subsystem (IMS); it should be appreciated that local area network(s) (LANs), which may be a part of enterprise NW(s), can also be interfaced with macro network platform 1710 through PS gateway node(s) 1718. Packet-switched gateway node(s) 1718 can generate packet data contexts when a data session is established. To that end, in an aspect, PS gateway node(s) 1718 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1714. It is to be noted that in 3GPP UMTS network(s), PS gateway node(s) 1718 (e.g., GGSN) and tunnel interface (e.g., TTG) can comprise a packet data gateway (PDG).

Macro network platform 1710 also includes serving node(s) 1716 that convey the various packetized flows of information, or data streams, received through PS gateway node(s) 1718. As an example, in a 3GPP UMTS network, serving node(s) can be embodied in serving GPRS support node(s) (SGSN).

As indicated above, server(s) 1714 in macro network platform 1710 can execute numerous applications (e.g., location services, online gaming, wireless banking, wireless device management, . . . ) that can generate multiple disparate packetized data streams or flows, and manage (e.g., schedule, queue, format . . . ) such flows. Such application(s), for example can include add-on features to standard services provided by macro network platform 1710. Data streams can be conveyed to PS gateway node(s) 1718 for authorization/ authentication and initiation of a data session, and to serving node(s) 1716 for communication thereafter. Server(s) 1714 can also effect security (e.g., implement one or more firewalls) of macro network platform 1710 to ensure network's operation and data integrity in addition to authorization and authentication procedures that CS gateway node(s) 1712 and PS gateway node(s) 1718 can enact. Moreover, server(s) 1714 can provision services from external network(s), e.g., WAN 1750, or Global Positioning System (GPS) network(s), which can be a part of enterprise NW(s) 1780. It is to be noted that server(s) 1714 can include one or more processors configured to confer at least in part the functionality of macro network platform 1710. To that end, the one or more processor can execute code instructions stored in memory 1730, for example.

In example wireless environment 1700, memory 1730 can store information related to operation of macro network platform 1710. The information can include data associated with subscribers; operational data for mobile devices served through the macro network platform 1710; service and privacy policies; end-user service logs for law enforcement; and so forth. Memory 1730 also can store information from the telephony network(s) 1740, WAN 1750, SS7 network 1760, enterprise NW(s) 1770, and/or service NW(s) 1780.

With respect to FIG. 18, in embodiment 1800, the base station 1810 can receive and transmit signal(s) from and to wireless devices like access points (e.g., base stations, femto access points), access terminals, wireless ports and routers, and the like, through a set of antennas $1869_1$-$1869_N$. It should be appreciated that while antennas $1869_1$-$1869_N$ are a part of a communication platform 1820, which comprises electronic components and associated circuitry that can provide for processing and manipulation of received signal(s) and signal(s) to be transmitted. In an aspect, the communication platform 1820 can include a receiver/transmitter 1866 that can convert signal from analog to digital upon reception, and from digital to analog upon transmission. In addition, receiver/transmitter 1866 can divide a single data stream into multiple, parallel data streams, or perform the reciprocal operation. Coupled to receiver/transmitter 1866 can be a multiplexer/demultiplexer 1867 that can facilitate manipulation of signal in time and frequency space. The multiplexer/demultiplexer (mux/demux) 1867 can multiplex information (e.g., data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, multiplexer/demultiplexer component 1867 can scramble and spread information (e.g., codes) according to substantially any code known in the art, e.g., Hadamard-Walsh codes, Baker codes, Kasami codes, polyphase codes, and so on. A modulator/demodulator (mod/demod) 1868 also can be part of operational group 1825, and can modulate information according to multiple modulation techniques, such as frequency modulation, amplitude modulation (e.g., M-ary quadrature amplitude modulation (QAM), with M a positive integer), phase-shift keying (PSK), and the like.

The base station 1810 also can comprise a processor 1835 configured to confer and/or facilitate providing functionality, at least partially, to substantially any electronic component in or associated with the base station 1810. For instance, processor 1835 can facilitate enabling the resource management component 1830 to manage use of resources (e.g., resource blocks, radio resources, transport resources, . . . ) in accordance with various aspects and embodiments disclosed herein. In addition, processor 1835 can facilitate operations on data (e.g., symbols, bits, or chips) for multiplexing/demultiplexing, such as effecting direct and inverse fast Fourier transforms, selection of modulation rates, selection of data packet formats, inter-packet times, etc. A memory 1855 can store data structures, code instructions, system or device information like policies and specifications, code sequences for scrambling, spreading and pilot transmission, floor plan configuration, access point deployment and frequency plans, scheduling policies, and so on.

In embodiment 1800, processor 1834 can be coupled to the memory 1855 in order to store and retrieve information desired to operate and/or confer functionality to the communication platform 1820, the resource management component 1830, and other operational components of base station 1810.

It is to be appreciated and understood that components (e.g., resource management component, resource coordinator component, . . . ), as described with regard to a particular system or methodology, can include the same or similar functionality as respective components as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; femtocell configuration (e.g., devices served by a femto AP; access control lists, or white lists) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
receiving, by a base station device comprising a processor, message data from a first user equipment served by the base station device, wherein the message data is indicative of a determination that a radio path between the first user equipment and the base station device does not satisfy a defined criterion;
in response to the receiving, facilitating, by the base station device, a transmission of instruction data to a set of user equipment served by the base station device, wherein the instruction data requests the set of user equipment to direct ping signals to the first user equipment; and
subsequent to a selection of a second user equipment from the set of user equipment based on determining, in accordance with an analysis of the ping signals received by the first user equipment, that the second user equipment is closer to the base station device than a third user equipment of the set of user equipment, facilitating, by the base station device, a communication with the first user equipment via the second user equipment,
wherein the facilitating the communication is in response to determining that a first signal quality of a first signal transmitted between the base station device and the first user equipment is lower than a second signal quality of a second signal transmitted between the base station device and the second user equipment.

2. The method of claim 1, wherein the receiving comprises receiving an echo transmission indicative of a resource block utilized by the first user equipment.

3. The method of claim 1, wherein the message data is first message data and the method further comprises:
subsequent to the selection, receiving, by the base station device, second message data from the first user equipment, wherein the second message data comprises identification data associated with the second user equipment.

4. The method of claim 1, wherein the facilitating the transmission of instruction data comprises broadcasting the instruction data to a subset of the set of user equipment in response to determining that the subset of the set of user equipment are operating in an idle mode during which respective resources of the subset of the set of user equipment are not being fully engaged.

5. The method of claim 1, wherein the facilitating the transmission of instruction data comprises broadcasting the instruction data to a subset of the set of user equipment in response to determining that to the subset of the set of user equipment are operating in an active mode during which the subset of the set of user equipment are not employing more than a defined amount of resources.

6. The method of claim 1, wherein the transmission is a first transmission and the method further comprises:
facilitating, by the base station device, a second transmission of request data to the second user equipment, wherein the request data is indicative of a request for signal quality report data from the second user equipment.

7. The method of claim 6, further comprising:
as a function of the facilitating the second transmission, receiving, by the base station device, the signal quality report data from the second user equipment, wherein the signal quality report data is employed to facilitate the determining that the first signal quality is lower than the second signal quality.

8. The method of claim 6, further comprising:
based on the signal quality report data received from the second user equipment, determining, by the base station device, that the first signal quality is not lower than the second signal quality; and
in response to the determining that the first signal quality is not lower than the second signal quality, facilitating, by the base station device, a third transmission of request rejection data to the first user equipment, wherein the request rejection data is indicative of a rejection of request to facilitate the communication via the second user equipment.

9. The method of claim 8, further comprising:
in response to the determining that the first signal quality is not lower than the second signal quality, facilitating, by the base station device, a fourth transmission of communication data to the first user equipment via the radio path.

10. The method of claim 1, further comprising:
receiving, by the base station device, confirmation data from the first user equipment and the second user equipment, wherein the confirmation data is indicative of a confirmation that a device-to-device communication has been established between the first user equipment and the second user equipment and wherein the facilitating the communication is in response to the receiving the confirmation data.

11. A base station device, comprising:
a memory to store instructions; and
a processor, coupled to the memory, that facilitates execution of the instructions to perform operations, comprising:
receiving, from a first user equipment served by the base station device, message data that is indicative of a determination that a radio path between the first user equipment and the base station device does not satisfy a defined criterion,
in response to the receiving, directing instruction data to a set of user equipment served by the base station device, wherein the instruction data requests the set of user equipment to direct ping signals to the first user equipment,
receiving, from the first user equipment, selection data indicative of a second user equipment of the set of user equipment that has been selected in accordance with a determination, based on an analysis of the ping signals received by the first user equipment, that the second user equipment is closer to the base station device than a third user equipment of the set of user equipment, and
in response to determining that a first signal quality of a first signal transmitted between the base station device and the first user equipment is lower than a second signal quality of a second signal transmitted between the base station device and the second user equipment, facilitating a communication with the first user equipment via the second user equipment.

12. The base station device of claim 11, wherein the message data comprises an echo transmission indicative of a resource block utilized by the first user equipment.

13. The base station device of claim 11, wherein a subset of the set of user equipment is determined to be operating in an idle mode of operation, wherein during the idle mode of operation respective resources of the subset of the set of user equipment are not being fully engaged.

14. The base station device of claim 11, wherein the operations further comprise:
   directing, to the second user equipment, request data indicative of a request for signal quality report data from the second user equipment.

15. The base station device of claim 14, wherein the operations further comprise:
   as a function of the directing the request data, receiving, from the second user equipment, the signal quality report data, and
   analyzing the signal quality report data to facilitate the determining that the first signal quality is lower than the second signal quality.

16. The base station device of claim 11, wherein the operations further comprise:
   receiving confirmation data from the first user equipment and the second user equipment, wherein the confirmation data is indicative of a confirmation that a device-to-device communication has been established between the first user equipment and the second user equipment and wherein the facilitating the communication is in response to the receiving the confirmation data.

17. A non-transitory computer readable device comprising instructions that, in response to execution, cause an access point station device comprising a processor to perform operations, comprising:
   determining that a radio path between the access point device and a first user equipment served by the access point device does not satisfy a defined criterion;
   in response to the determining, directing instruction data to a set of user equipment served by the access point device, wherein the instruction data requests the set of user equipment to direct ping signals to the first user equipment; and
   in response to verifying that a first signal quality of a first signal transmitted between the access point device and the first user equipment is lower than a second signal quality of a second signal transmitted between the access point device and a second user equipment of the set of user equipment, facilitating a communication with the first user equipment via the second user equipment,
   wherein the second user equipment is selected from the set of user equipment in accordance with a determination, based on an analysis of the ping signals received by the first user equipment, that the second user equipment is closer to the access point device than a third user equipment of the set of user equipment.

18. The non-transitory computer readable device of claim 17, wherein the determining that the radio path does not satisfy the defined criterion comprises determining that the radio path does not satisfy the defined criterion based on message data received from the first user equipment.

19. The non-transitory computer readable device of claim 18, wherein the message data comprises an echo transmission indicative of a resource block utilized by the first user equipment.

20. The non-transitory computer readable device of claim 17, wherein the verifying comprises verifying that the first signal quality is lower than the second signal quality based on an analysis of signal quality report data received from the second user equipment.

* * * * *